(12) United States Patent
Chen

(10) Patent No.: US 11,288,779 B2
(45) Date of Patent: Mar. 29, 2022

(54) METHOD AND DEVICE FOR IMAGE CORRECTION AND STORAGE MEDIUM

(71) Applicant: BEIJING XIAOMI MOBILE SOFTWARE CO., LTD., Beijing (CN)

(72) Inventor: Zhijun Chen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 30 days.

(21) Appl. No.: 16/842,861

(22) Filed: Apr. 8, 2020

(65) Prior Publication Data
US 2020/0394769 A1  Dec. 17, 2020

(30) Foreign Application Priority Data
Jun. 13, 2019 (CN) ......................... 201910511806.X

(51) Int. Cl.
*G06T 5/00* (2006.01)
*G06T 7/70* (2017.01)
*G06T 7/00* (2017.01)

(52) U.S. Cl.
CPC ............ *G06T 5/006* (2013.01); *G06T 7/0002* (2013.01); *G06T 7/70* (2017.01); *G06T 2207/20132* (2013.01); *G06T 2207/30201* (2013.01)

(58) Field of Classification Search
CPC .......... G06T 5/006; G06T 5/001; G06T 5/00; G06T 7/70; G06T 7/73; G06T 7/77; G06T 7/60; G06T 7/0002; G06T 7/00; G06T 2207/20132; G06T 2207/20112;
(Continued)

(56) References Cited

U.S. PATENT DOCUMENTS

2002/0196472 A1* 12/2002 Enomoto ................. H04N 1/58
                                                     358/3.26
2003/0026473 A1*  2/2003 Lee ........................... G06T 7/33
                                                     382/152
(Continued)

FOREIGN PATENT DOCUMENTS

CN   101038163 A    9/2007
CN   103729843 A    4/2014
(Continued)

OTHER PUBLICATIONS

Extended European Search Report dated Sep. 25, 2020 in European Patent Application No. 201696002, 7 pages
(Continued)

*Primary Examiner* — Sean M Conner
*Assistant Examiner* — Stephen M Brinich
(74) *Attorney, Agent, or Firm* — Oblon, McClelland, Maier & Neustadt, L.L.P.

(57) ABSTRACT

The present disclosure relates to a method and device for image correction and a storage medium. The method can include a correction offset for each unit to be corrected in an image is determined, at least one target region in the image is determined, an image weight coefficient for each unit to be corrected in the image is determined according to the at least one target region, a final offset for each unit to be corrected in the image is determined according to the image weight coefficient and the correction offset, and each unit to be corrected in the image is corrected according to the final offset.

11 Claims, 22 Drawing Sheets

(58) Field of Classification Search
CPC . G06T 2207/30201; G06T 2207/30196; G06T 2207/30204; G06T 2207/30208
See application file for complete search history.

(56) References Cited

U.S. PATENT DOCUMENTS

| | | | |
|---|---|---|---|
| 2003/0142753 A1* | 7/2003 | Gunday | H04N 7/18 375/240.29 |
| 2016/0071236 A1* | 3/2016 | Sato | G06K 9/00228 382/282 |
| 2018/0061086 A1 | 3/2018 | Yoshimura et al. | |
| 2020/0005508 A1* | 1/2020 | Hu | G06K 9/4652 |

FOREIGN PATENT DOCUMENTS

| | | |
|---|---|---|
| CN | 104166955 A | 11/2014 |
| CN | 106404173 A | 2/2017 |
| CN | 106683045 A | 5/2017 |
| CN | 106981050 A | 7/2017 |
| CN | 107945113 A | 4/2018 |

OTHER PUBLICATIONS

"Lens distortion and its correction method," CSDN, Retrieved from the Internet [URL: https://blog.csdn.net/piaoxuezhong/article/details/75268535], Jul. 30, 2017, 52 pages (with English language translation).

\* cited by examiner

METHOD AND DEVICE FOR IMAGE CORRECTION AND STORAGE MEDIUM

CROSS-REFERENCE TO RELATED APPLICATIONS

This application is filed based upon and claims priority to Chinese Patent Application No. 201910311806.X, filed on Jun. 13, 2019, the entire contents of which are incorporated herein by reference.

TECHNICAL FIELD

The present disclosure generally relates to an image processing technology, and more particularly, to a method and device for image correction and a storage medium.

BACKGROUND

Lenses of cameras include optical lenses. When a picture is taken with the camera, a distortion or an image deformation, called an image distortion can occur. Image distortions include pincushion distortions, barrel distortions, linear distortions, and other types. An image distortion may not be completely eliminated and commonly occurs in a shooting process. A picture that has been taken may be processed by use of an image distortion correction method to reduce influence brought by the distortion as much as possible. Image distortion correction methods can be undiversified, and are usually full-image correction where specificity of a target region in an image is not considered.

For example, when a picture is taken, a part relatively far away from a center of a camera may be distorted. This can be particularly noticeable when a face is on an edge of the picture, such a distortion may be clearly perceived by a user. If conventional techniques are adopted for image correction, a background may be changed to cause incoordination.

SUMMARY

Aspects of the disclosure can provide an image correction method through which image correction is implemented in consideration of both specificity of a target region and coordination of the target region and an overall image background. Further, the present disclosure can provide an image correction method, device, and a storage medium.

According to a first aspect of embodiments of the present disclosure, an image correction method is provided. The method can include the steps of a correction offset for each unit to be corrected in an image being determined, at least one target region being determined in the image, and an image weight coefficient for each unit to be corrected in the image being determined according to the at least one target region. Further, the method can include a final offset for each unit to be corrected in the image being determined according to the image weight coefficient and the correction offset, and each unit to be corrected in the image being corrected according to the final offset.

According to a second aspect of the embodiments of the present disclosure, an image correction device is provided, which may include a processor and a memory configured to store instructions executable by the processor. The processor is configured to run the instructions to determine a correction offset for each unit to be corrected in an image, determine at least one target region in the image, and determine an image weight coefficient for each unit to be corrected in the image according to the at least one target region. Further, the processor can be configured to determine a final offset for each unit to be corrected in the image according to the image weight coefficient and the correction offset, and correct each unit to be corrected in the image according to the final offset.

According to a third aspect of the embodiments of the present disclosure, a non-transitory computer-readable storage medium having a computer-executable instruction stored thereon is provided. When the computer-executable instruction can be executed by a processor to implement the operations in any image correction method provided above.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In a practical photographing process, an image in a position relatively far away from a center of a camera may be distorted, and particularly when a distortion exists in a position of a face, such a distortion is perceived more easily. A distortion correction method is usually correcting a whole image, and by this method, a background may be changed to cause incoordination of the image. Therefore, in the embodiments of the present disclosure, distortion correction is performed only on part of a region in an image, for example, only a face region is corrected, and a background region is not corrected, so that the corrected image is prevented from incoordination.

Herein, a conventional distortion correction method is briefly described.

Figure 1A:
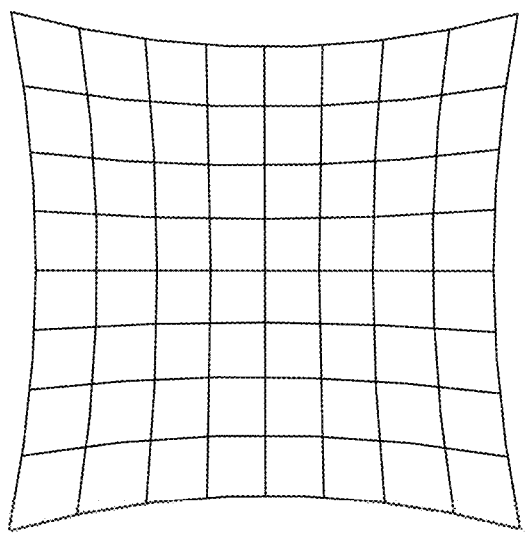
FIG. 1A is a schematic diagram illustrating a barrel distortion of an image.
Figure 1B:
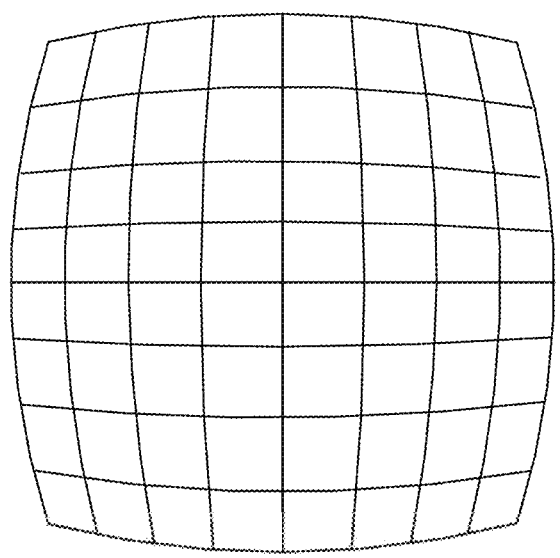
FIG. 1B is a schematic diagram illustrating a pincushion distortion of an image.

Image distortions mainly include two types, i.e., radial distortion and tangential distortion. The radial distortion refers to a distortion distributed along a radius direction of a lens element of a camera lens and is produced because light is bent at a position far away from a center of the lens element more than a position close to the center. The tangential distortion refers to a distortion produced by non-parallelism of the lens of the camera lens and a camera sensor plane, i.e., an imaging plane, and is mostly caused by a mounting error of a lens element adhered to a lens module. The radial distortion mainly includes a barrel distortion shown in FIG. 1A and a pincushion distortion shown in FIG. 1B.

Herein, for example, the radial distortion is corrected. A distortion at an optical axis of an imager of the camera is 0, and along the radius direction of the lens, the distortion at a position farther away from a circle center of the lens is more seriously. A mathematical model of the distortion may be described with first few items of a Taylor series expansion around a principal point, usually with the first two items, i.e., $k_1$ and $k_2$. For a lens with a large distortion, for example, a fish-eye lens, the third item $k_3$ may be additionally adopted for description. A position and corrected position of a certain pixel on the imager may be determined by the following formula 1:

$$x_0 = x(1 + k_1 r^2 + k_2 r^4 + k_3 r^6)$$

$$y_0 = y(1 + k_1 r^2 + k_2 r^4 + k_3 r^6) \qquad \text{(formula 1)},$$

where $(x_0, y_0)$ is the original position of the distorted pixel on the imager, i.e., a coordinate of the pixel in the distorted image, $(x, y)$ is a coordinate corresponding to the corrected pixel, $k_i$ is a distortion coefficient for the camera lens, and $r$ is a distance between the uncorrected position of the present pixel and a center of an image.

The distortion coefficient $k_i$ of the camera lens can be determined in a camera calibration manner, which may be known through the related conventional art by those skilled in the art, and elaborations are omitted herein.

The technical solutions of the present disclosure will further be elaborated below in combination with the accompanying drawings and the embodiments.

Figure 2:
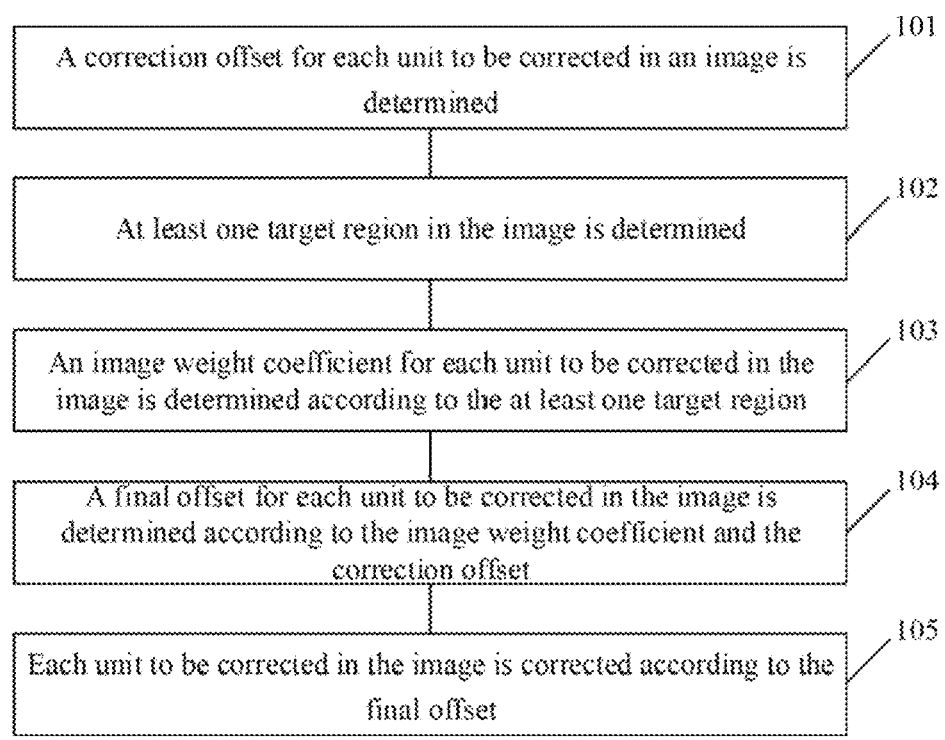
FIG. 2 is a flow chart showing an image correction method, according to an exemplary embodiment.

FIG. 2 is a flow chart showing an image correction method, according to an exemplary embodiment. As shown in FIG. 2, the method includes the following operations.

In Operation 101, a correction offset for each unit to be corrected in an image is determined.

Herein, the correction offset for each unit to be corrected in the image may be determined according to a manner in the related art. In such case, the image is a whole, and a determined correction offset for each pixel is related only to a related parameter of a lens and a position of the pixel, but is irrelated to a content in the image. After determination, each pixel has a correction offset (dx, dy).

In Operation 102, a target region is determined in the image. For different images, regions required to be corrected may be set according to contents of the images, types of the images or other aspects, the regions required to be corrected may also be determined according to a certain rule, and these regions are determined to be target regions.

In Operation 103, an image weight coefficient for each unit to be corrected in the image is determined according to the target region. Since pixels in the target region are required to be corrected and pixels in a region other than the target region are not required to be corrected or are not required to be completely corrected, image weight coefficients for pixels in the image may be set according to the target region, the image weight coefficient is configured to represent a correction degree. For example, 100% correction is performed on the pixels in the target region direct by direct use of the correction offsets (dx, dy); and the pixels in the region other than the target region may not be corrected or may be corrected by an offset which is obtained by multiplying the correction offsets (dx, dy) by the corresponding image weight coefficients. For example, if the image weight coefficient is set to be 10%, the corresponding pixel may be corrected according to 10%×(dx, dy).

In Operation 104, a final offset for each unit to be corrected in the image is determined according to the image weight coefficient and the correction offset. After the image weight coefficient corresponding to each unit to be corrected in different regions in the image is determined, the final offset is determined according to the image weight coefficient and the original correction offset. For example, if the image weight coefficient is a, the final offset for a certain pixel is a×(dx, dy).

In Operation 105, each unit to be corrected in the image is corrected according to the final offset. The image is corrected according to the final offsets. Since the pixels in different regions correspond to different image weight coefficients, different regions correspond to different correction degrees. Correction according to the final offsets implements pertinent correction of the pixels in different regions in the image and avoids incoordination caused by unified correction of the whole image.

Figure 3:
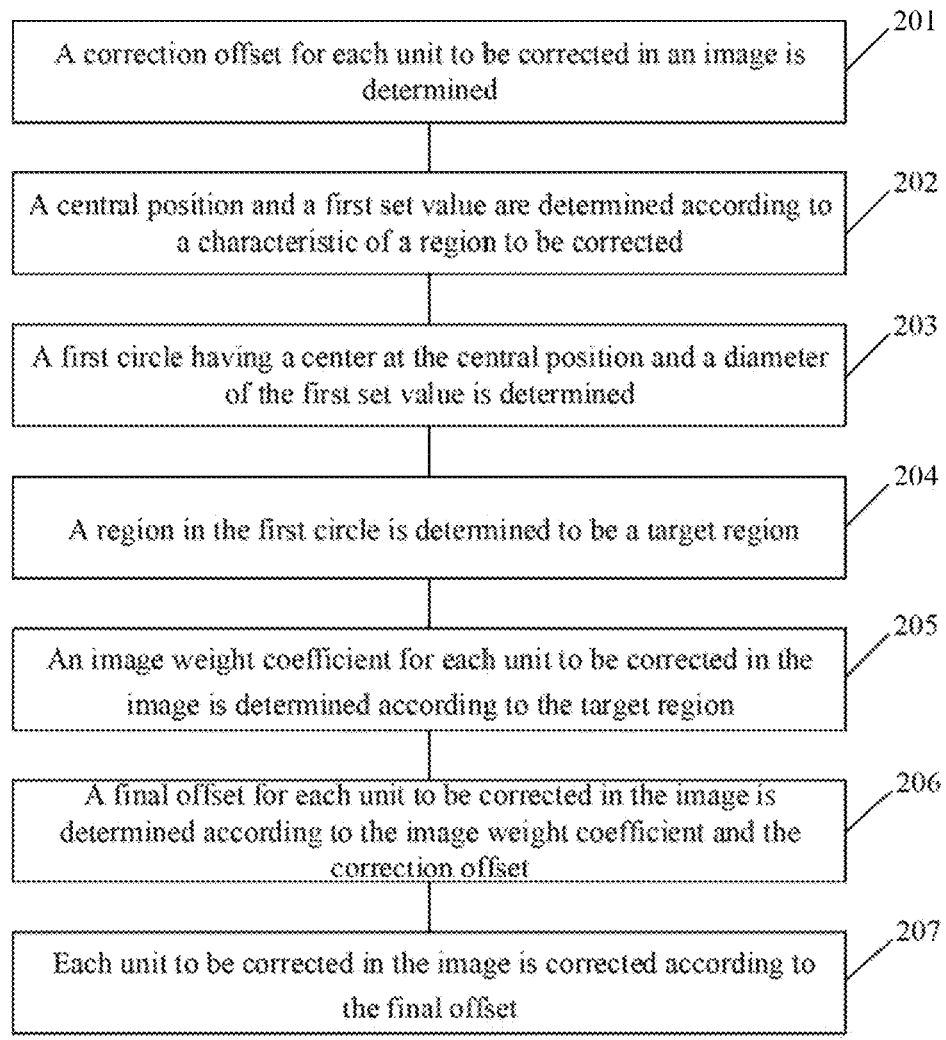
FIG. 3 is a flow chart showing another image correction method, according to an exemplary embodiment.

FIG. 3 is a flow chart showing another image correction method, according to an exemplary embodiment. As shown in FIG. 3, the method includes the following operations.

In Operation 201, a correction offset for each unit to be corrected in an image is determined.

In Operation 202, a central position and a first set value are determined according to a characteristic of a target region.

In Operation 203, a first circle having a center at the central position and a diameter of the first set value is determined.

In Operation 204, a region within the first circle is determined to be the target region.

In Operation 205, an image weight coefficient for each unit to be corrected in the image is determined according to the target region.

In Operation 206, a final offset for each unit to be corrected in the image is determined according to the image weight coefficient and the correction offset.

In Operation 207, each unit to be corrected in the image is corrected according to the final offset.

Operation 202 and Operation 204 form an implementation of the operation in Operation 102 that the target region is determined, and the circular target region is determined in a manner of determining the circle center and the diameter. The central position and the first set value may be determined according to a content of the image. For example, they can be determined according to a position of a face in the image. A position of a face center is determined to be the central position, namely a pixel position corresponding to the face center may be determined to be the central position, and the first set value is determined according to a range of the face. They may also be set according to a set rule. For example, a specified position, for example, a position of a pixel in an nth row and an mth column in a left upper corner, in the image is set as the central position, and a specified length, for example, ½ of an image width, is set as the first set value.

Figure 4:
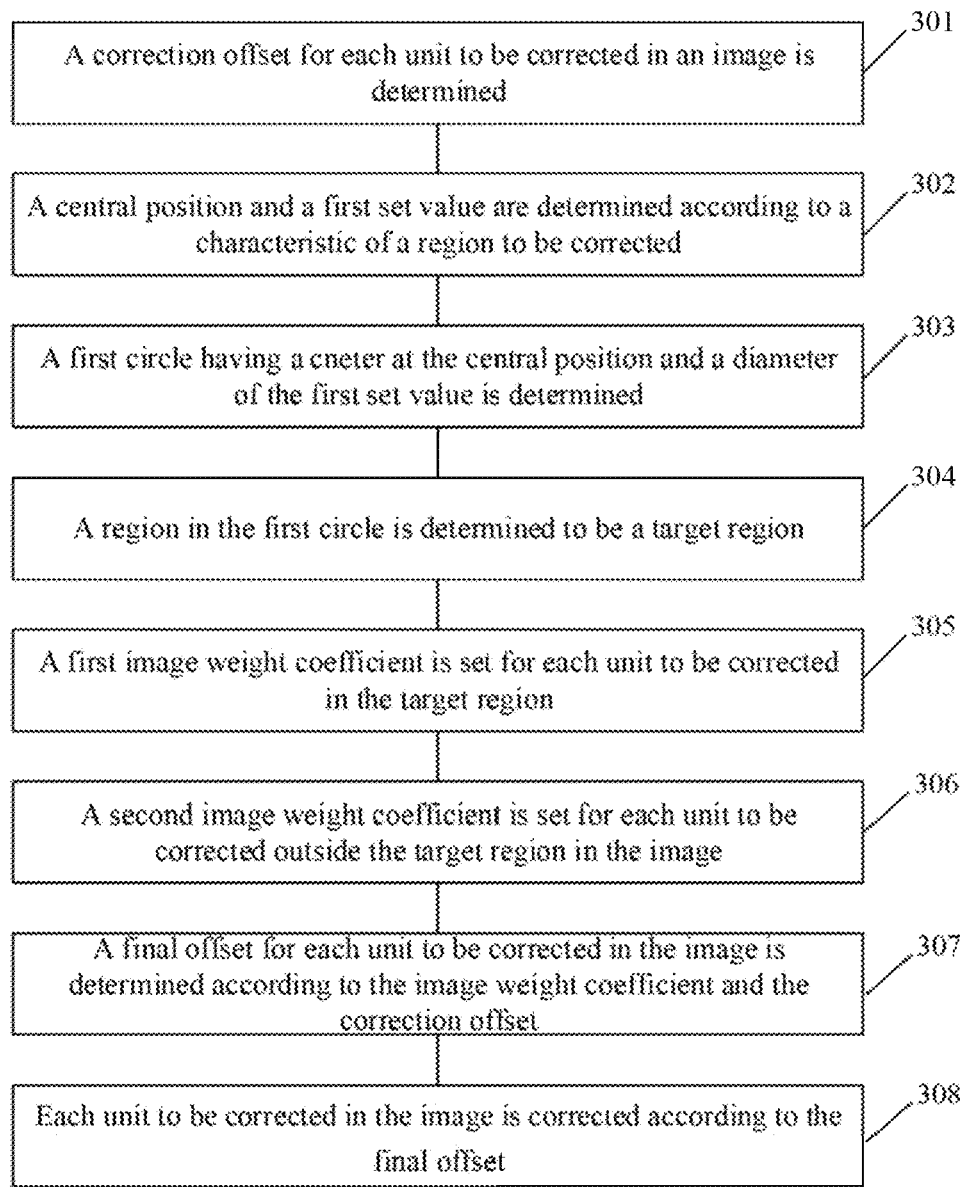
FIG. 4 is a flow chart showing another image correction method, according to an exemplary embodiment.

FIG. 4 is a flow chart showing another image correction method, according to an exemplary embodiment. As shown in FIG. 4, the method includes the following operations.

In Operation 301, a correction offset for each unit to be corrected in an image is determined.

In Operation 302, a central position and a first set value are determined according to a characteristic of a target region.

In Operation 303, a first circle having a center at the central position and a diameter of the first set value is determined.

In Operation 304, a region within the first circle is determined as the target region.

In Operation 305, a first image weight coefficient is set for each unit to be corrected in the target region, the first coefficient is greater than 0 and less than or equal to 1.

In Operation 306, a second image weight coefficient is set for each unit to be corrected outside the target region in the image, the second coefficient is more than or equal to 0 and less than the first coefficient.

In Operation 307, a final offset for each unit to be corrected in the image is determined according to the image weight coefficient and the correction offset.

In Operation 308, each unit to be corrected in the image is corrected according to the final offset.

Operation 305 and Operation 306 form an implementation of the operation in Operation 205 that the image weight coefficients are determined according to the target region. Since each unit to be corrected in the target region is required to be corrected, namely the final offset is required to be greater than 0, the first image weight coefficient greater than 0 and less than or equal to 1 is set for each unit to be corrected in the target region, and the final offset obtained after the correction offset is processed by use of the first coefficient is not 0. Therefore, each unit to be corrected in the target region may be corrected. When the image weight coefficient in the target region is set to be 1, the original correction offset is reserved, and correction for the target region is 100% correction.

Each unit to be corrected outside the target region is not required to be corrected or does not require 100% correction, and even though these pixels are corrected, at least correction degrees are lower than those of pixels in the target region. Therefore, the second image weight coefficient less than the first coefficient is set for each unit to be corrected outside the target region. When the second coefficient is 0, the final offset is (0, 0), namely correction is not performed, so that an effect of these pixels in the original image is kept.

Figure 5:
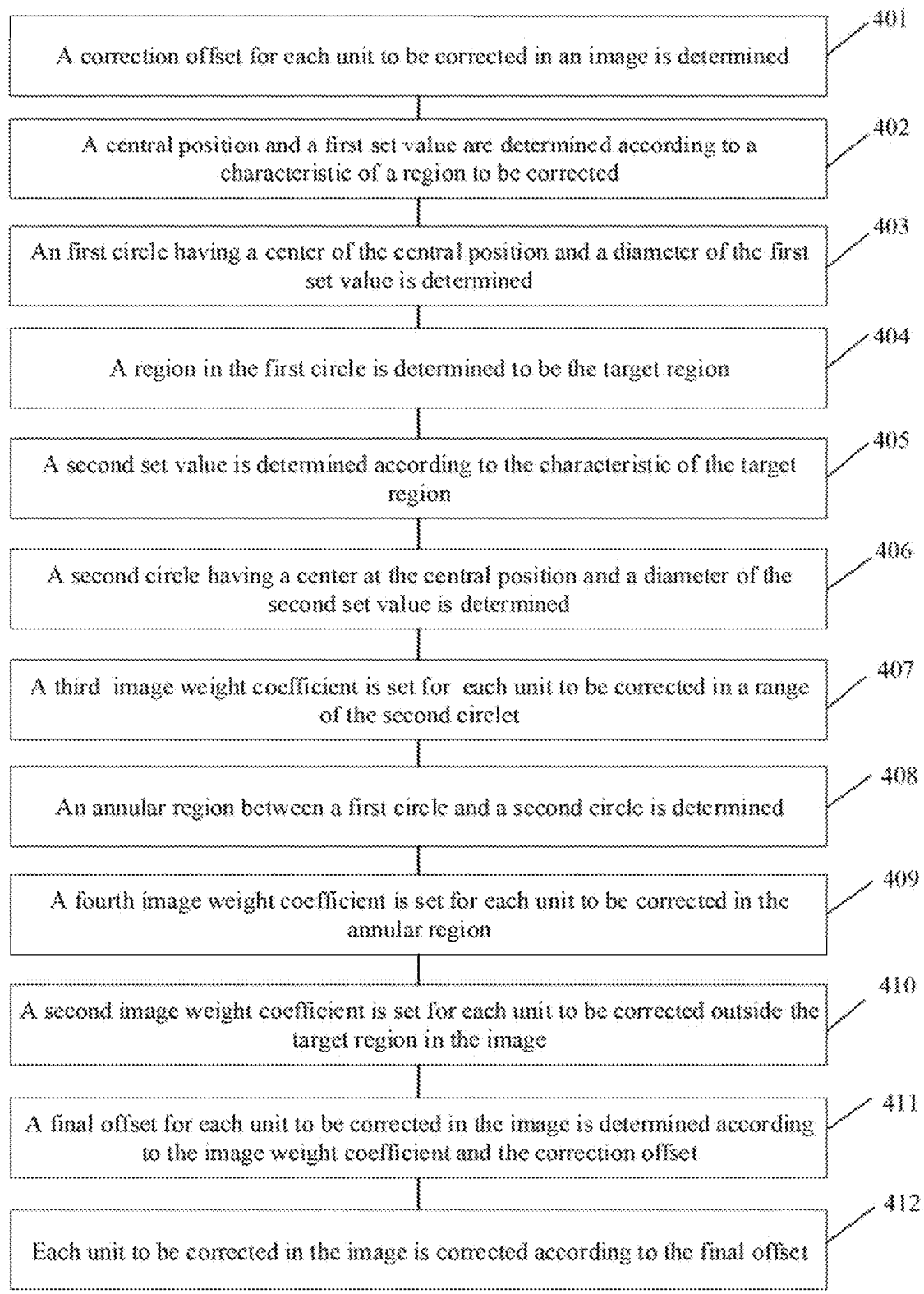
FIG. 5 is a flow chart showing another image correction method, according to an exemplary embodiment.

FIG. 5 is a flow chart showing another image correction method, according to an exemplary embodiment. As shown in FIG. 5, the method includes the following operations.

In Operation 401, a correction offset for each unit to be corrected in an image is determined.

In Operation 402, a central position and a first set value are determined according to a characteristic of a target region.

In Operation 403, a first circle having a center at the central position and a diameter of the first set value is determined. Herein, the central position and the first set value may be determined according to a content of the image and may also be set according to another rule. For example, a position of a face in the image is determined, a position of a face center is determined as the central position, and a length of the face is determined as the first set value.

In Operation 404, a region within the first circle is determined as the target region.

In Operation 405, a second set value is determined according to the characteristic of the target region.

In Operation 406, a second circle having a center at the central position and a diameter of the second set value is determined, the second set value is less than the first set value;

In Operation 407, a third image weight coefficient is set for each unit to be corrected within a range of the second circle.

In Operation 408, an annular region between the second circle and the first circle is determined.

In Operation 409, a fourth image weight coefficient is set for each unit to be corrected in the annular region, the fourth image weight coefficients from the second circle to the first circle are gradually decrease proportionally from the third image weight coefficient to a second image weight coefficient. Herein, the first image weight coefficient includes the third image weight coefficient and the fourth image weight coefficient.

In Operation 410, the second image weight coefficient is set for each unit to be corrected outside the target region in the image, the second coefficient is more than or equal to 0 and less than the first coefficient.

In Operation 411, a final offset for each unit to be corrected in the image is determined according to the image weight coefficient and the correction offset.

In Operation 412, each unit to be corrected in the image is corrected according to the final offset.

In Operation 405 and Operation 409, a manner for determining the first coefficient is provided. The second circle of which the diameter is less than the diameter of the first circle is determined in the first circle, the image weight coefficient within the second circle is set to be the third coefficient, for example, set to be 1, and then the unit to be corrected within the second circle may be corrected by use of the third coefficient as a weight. In a range of a circular ring from the second circle to the first circle, weights may gradually decrease for a transition to a range outside the first circle, thereby ensuring more natural correction of the image.

In another embodiment, more than two second circles may be determined in a range of the first circle for a purpose of dividing the target region more finely. The second circle may be a concentric circle of the first circle and takes the central position as the circle center, and the first coefficients gradually decreasing to the first circle are determined to ensure that a transition is formed from the image weight coefficient for each unit to be corrected in the target region to the image weight coefficient for each unit to be corrected outside the target region. A central part of the target region is corrected maximally and an edge part of the target region is corrected to a relatively low degree. In such a manner, damage of regional correction to integrity of the image may be avoided in a correction process, and more natural correction may be implemented.

In another embodiment, the operation that the first circle having the center at the set central position and the diameter of the first set value is determined includes the following operations: a position of a face in the image is determined according to a face recognition algorithm; a face center is determined according to the position of the face; the face center is determined to be the central position; the first set value is determined according to a range of the face; and the first circle having the center at the central position and the diameter of the first set value is determined.

Herein, for example, the face is corrected. The position of the face in the image is determined by face recognition, and the face center is determined. The face center may be determined by determining a position of the nasal tip of the face and may also be determined in another manner. Then, the first set value is set according to the range of the face to determine the first circle, i.e., a range of the target region. In such a manner, the range of the face in the image may be determined to be the target region for subsequent correction, and a background region outside the face may not be corrected.

In another embodiment, the operation that the first set value is determined according to the range of the face includes an operation that the first set value is determined according to a length of the face.

In determining the first set value, the length of the face may be determined by recognizing a characteristic in the face, for example, determining a hairline and an edge of the lower jaw, and the first set value is determined according to the length of the face. The first circle having a diameter of the first set value is determined, and the first circle may surround pixels in the face.

Figure 6:
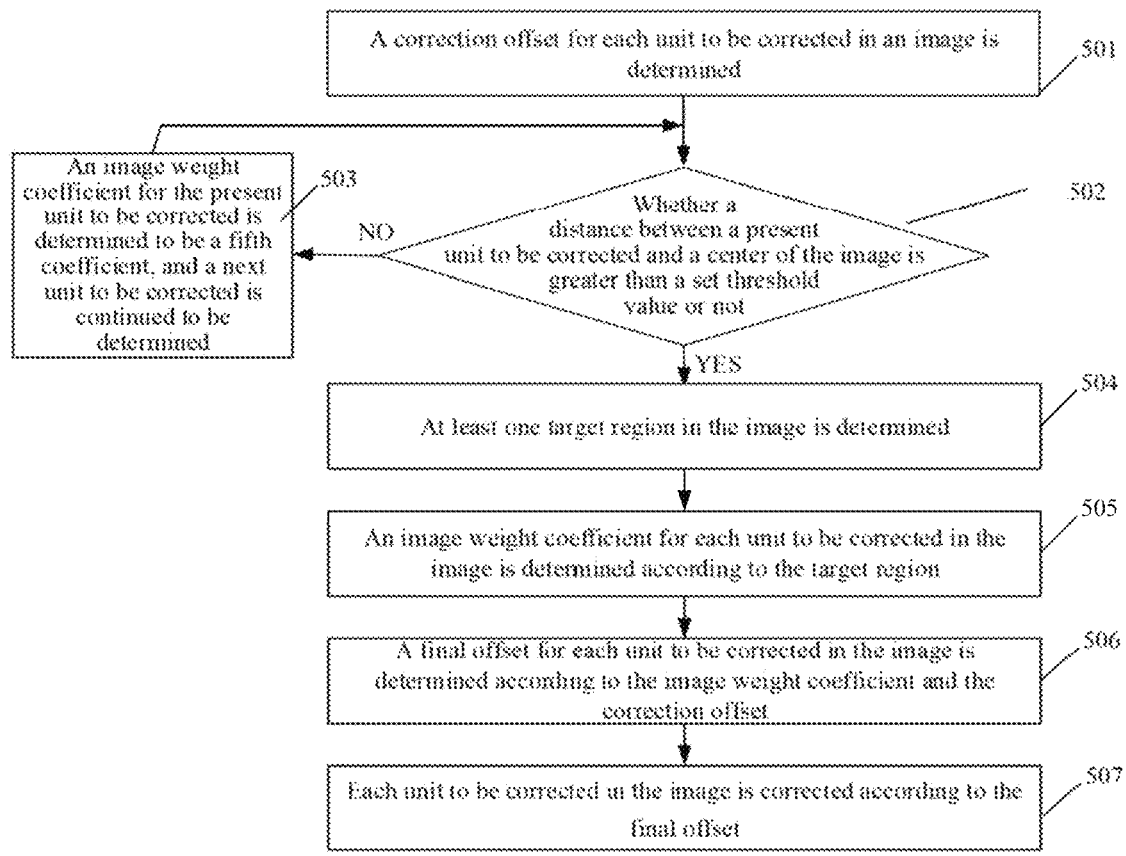
FIG. 6 is a flow chart showing another image correction method, according to an exemplary embodiment.

FIG. 6 is a flow chart showing another image correction method, according to an exemplary embodiment. As shown in FIG. 6, the method includes the following operations.

In Operation 501, a correction offset for each unit to be corrected in an image is determined.

In Operation 502, whether a distance between a present pixel and a center of the image is greater than a set threshold value or not is determine. When the distance is greater than the set threshold value, Operation 504 is entered; and when the distance is not greater than the set threshold value, Operation 503 is entered.

In Operation 503, a weight coefficient for the present pixel is determined to be a fifth coefficient, and Operation 502 is re-executed for a next pixel, the fifth pixel is less than 1 and more than or equal to 0. That is, when determining that a distance between each unit to be corrected in the image and the center of the image is greater than the set threshold value, a target region is determined; and when determining that the distance between each unit to be corrected in the image and the center of the image is not greater than the set threshold value, an image weight coefficient for the unit to be corrected in the image is determined to be the fifth coefficient, the fifth coefficient is less than 1 and more than or equal to 0. Herein, the center of the image refers to a central position of the original image, and can be understood as an intersection of diagonals of the rectangular image.

In Operation 504, at least one target region in the image is determined.

In Operation 505, an image weight coefficient for each unit to be corrected in the image is determined according to the target region.

In Operation 506, a final offset for each unit to be corrected in the image is determined according to the image weight coefficient and the correction offset.

In Operation 507, each unit to be corrected in the image is corrected according to the final offset.

In Operation 502 and Operation 503, overall distortion non-uniformity of the image is considered, and a when radial distortion is produced, the distortion at the center of the image is relatively low, and the distortion at the periphery of the image is relatively high. Therefore, the set threshold value may be determined based on the center of the image and according to a type of a lens. For example, an image shot by a fish-eye lens has a relatively high distortion degree, so a relatively small threshold value may be set, while a relatively large threshold value may be set for an ordinary lens. After the set threshold value is determined, an image weight coefficient for a pixel at a distance not greater than the set threshold value, i.e., a pixel in a range of the center of the image, is determined to be the fifth coefficient. The fifth coefficient may be set to be a relatively low percentage value. When the fifth coefficient is 0, the pixel in the range of the center of the image is not subsequently processed, namely an effect of the original image is kept and correction is not performed.

For a pixel at a distance greater than the set threshold value far away from the center of the image, i.e., a pixel distributed on a periphery of the image, subsequent processing is performed, the target region is determined, and corresponding correction is performed.

In this manner, part of pixels not required to be corrected may be excluded at first, and then other pixels are processed, so that a calculated amount of data is greatly reduced, efficiency is improved, a display effect of the image may be ensured, and the problem of incoordination is solved.

Figure 7:
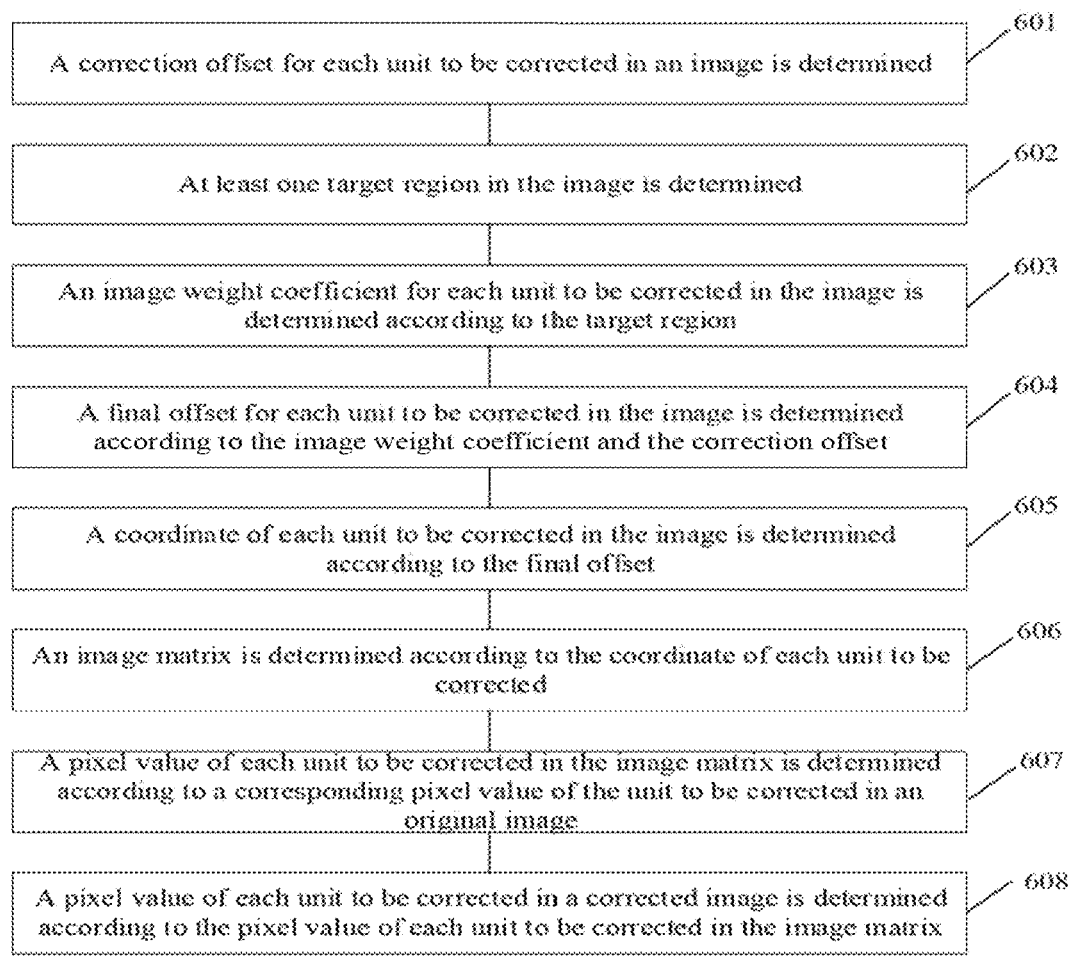
FIG. 7 is a flow chart showing another image correction method, according to an exemplary embodiment.

FIG. 7 is a flow chart showing another image correction method, according to an exemplary embodiment. As shown in FIG. 7, the method includes the following operations.

In Operation 601, a correction offset for each unit to be corrected in an image is determined.

In Operation 602, at least one target region in the image is determined.

In Operation 603, an image weight coefficient for each unit to be corrected in the image is determined according to the target region.

In Operation 604, a final offset for each unit to be corrected in the image is determined according to the image weight coefficient and the correction offset.

In Operation 605, a coordinate of each unit to be corrected in the image is determined according to the final offset.

In Operation 606, an image matrix is determined according to the coordinate of each unit to be corrected.

In Operation 607, a pixel value of each unit to be corrected in the image matrix is determined according to a corresponding pixel value of the unit in an original image.

In Operation 608, a pixel value of each unit to be corrected in the corrected image is determined according to the pixel value of each unit to be corrected in the image matrix, the pixel value includes a color value or a grayscale value.

Operation 605 to Operation 608 form an implementation of the operation in Operation 105 that each unit to be corrected in the image is corrected. Since processing over each unit to be corrected in the image in Operation 601 to Operation 605 is operation for coordinates of pixels, and after the coordinate of each unit to be corrected in the corrected image is determined, a final display effect of each unit to be corrected has yet not been determined, it is necessary to determine the pixel value, including the color value or the grayscale value, of each unit to be corrected. After the coordinate of each unit to be corrected in the whole image is determined according to the final offset, a coordinate matrix, called the image matrix herein, is formed by the coordinate of each unit to be corrected. Each pixel in the matrix may have a corresponding pixel in the original image, and a pixel value of the pixel in the image matrix is determined according to a pixel value in the original image. Therefore, a corresponding pixel in the image matrix may be found for each pixel in the corrected image, and a final pixel value in the corrected image may be determined according to a pixel value of the corresponding pixel in the original image.

For the corrected image to be finally generated, based on a known resolution, a position of each pixel is fixed, and the coordinates in the image matrix obtained by operation may not correspond to the positions of the pixels in the final image one to one. Therefore, a bilinear interpolation method may be adopted herein. For each final pixel, four pixel positions closest to a coordinate thereof in the image matrix are found, and then interpolation operation is performed on four pixel values of four pixels corresponding to the four pixel positions in the original image to obtain a final pixel value of the present pixel in the corrected image.

In another embodiment, after the operation that each unit to be corrected in the image is corrected according to the final offset in the abovementioned embodiment, the method can further include determining a region to be cropped according to the corrected image, and cropping the corrected image according to the region to be cropped.

After the image is corrected, pixels on an edge of the image may turn to black pixels, and for the whole image, an irregular black border may be presented. Therefore, for ensuring a display effect of the image, the image may be properly cropped, namely the irregular border is cropped and only a useful part in the image is reserved. In addition, a size of the image may also be properly regulated, for example, regulated to a size the same as that of the original image or regulated to a proper size as required.

Figure 8:
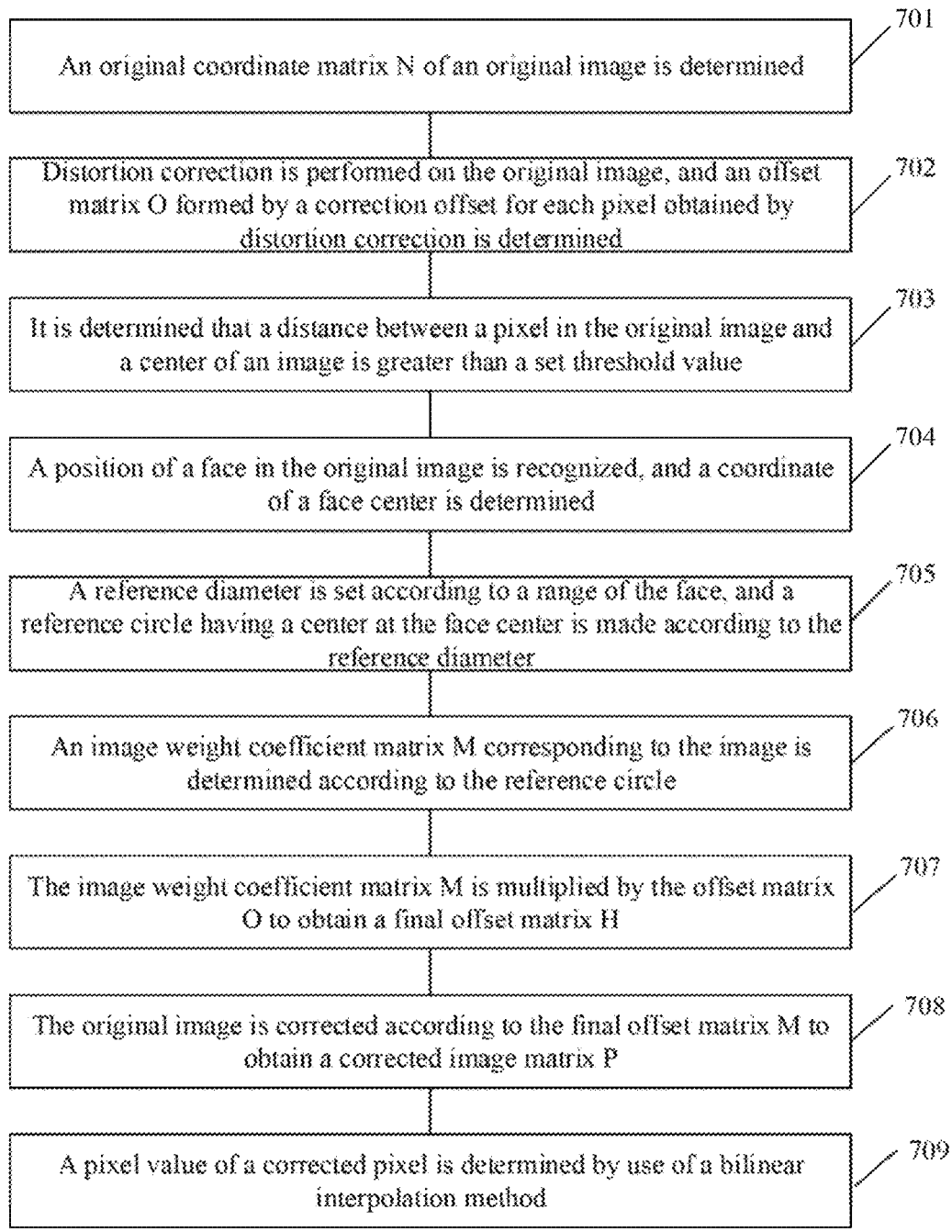
FIG. 8 is a flow chart showing another image correction method, according to an exemplary embodiment.

FIG. 8 is a flow chart showing another image distortion correction method, according to an exemplary embodiment. The abovementioned unit to be corrected may be a pixel in the image, and may also be a regulation unit formed by a plurality of pixels. Herein, the unit to be corrected is, for example, a pixel. As shown in FIG. 8, the method includes the following operations.

In Operation 701, an original coordinate matrix N of an original image is determined. Herein, the original image refers to a directly shot image, i.e., an uncorrected original image. Each pixel in the original image has a corresponding coordinate that may be represented with $(x_0,y_0)$, and a matrix formed by the coordinates $(x_0,y_0)$ of these pixels is called the original coordinate matrix N.

Figure 9A:
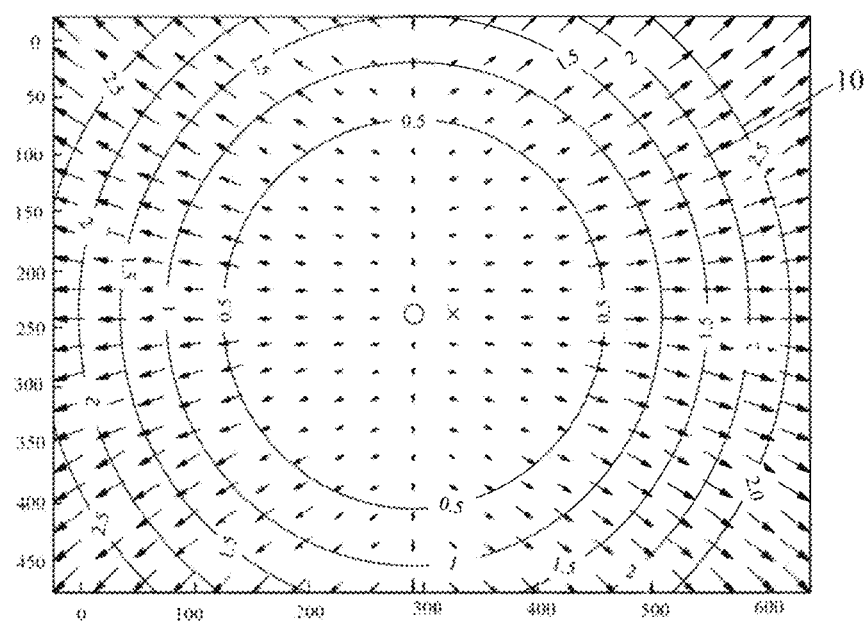
FIG. 9A is a schematic diagram illustrating coordinate changes during image correction, according to the related art.

In Operation 702, distortion correction is performed on the original image, and an offset matrix O formed by a correction offset (dx, dy) of each unit to be corrected obtained by distortion correction is determined. Herein, full-image correction is performed on the original image by use of a distortion correction method in the related art. As shown in FIG. 9A, the short line 10 in the figure represents the correction offset. The figure is a schematic diagram illustrating correction of a radial distortion. It can be seen that the correction offset for a center of the image is minimum, represented with a point and almost zero and the correction offsets gradually increase from the center to periphery of the image. A position of a coordinate of each pixel in the image obtained by distortion correction changes based on the original image, the coordinate of the pixel obtained by distortion correction may be represented with (x, y), and the coordinate is obtained after distortion correction is performed on the coordinate $(x_0,y_0)$ of the corresponding pixel in the original image based on the correction offset (dx, dy). Herein, a matrix formed by the correction offset (dx, dy) of each pixel is called the offset matrix O.

In Operation 703, determining, in the original image, units to be corrected whose distance from a center of the image is greater than a set threshold value, for the units to be corrected whose distance from the center of the image is greater than the set threshold value, subsequent operations are continued, and for units to be corrected whose distance from the center of the image is not greater than the set threshold value, a final offset for a present pixel is directly set to be 0.

When the radial distortion occurs to the image, a distortion degree at the center of the image is relatively low, and a distortion degree at a periphery of the image is relatively high. Therefore, the set threshold value may be determined based on the center of the image and according to a type of a lens. For example, an image shot by a fish-eye lens has a relatively high distortion degree, so a relatively small threshold value may be set; while a relatively large threshold value may be set for an ordinary lens. After the set threshold value is determined, a final offset for a pixel at a distance not greater than the set threshold value, i.e., a pixel in a range of the center of the image, is directly determined to be 0, and then the pixel in the range of the center of the image is not required to be subsequently processed, namely an effect of the original image is reserved and correction is not performed.

In Operation 704, a position of a face in the original image is recognized, and a coordinate of a face center is determined. Herein, a method in the related art may be adopted for face recognition, including geometric-characteristic-based, template-based or model-based methods, etc. After the position of the face is recognized, a coordinate of a pixel of the face center is determined. For example, a pixel at a position of the nasal tip of the face is determined as the face center, or a circle is made by taking positions of the forehead and lower jaw of the face as a border and a center of the circle is determined as a position of the face center. When there are multiple faces in the original image, positions of the multiple faces may also be recognized, and a coordinate of a pixel of each face center is determined.

Figure 9B:
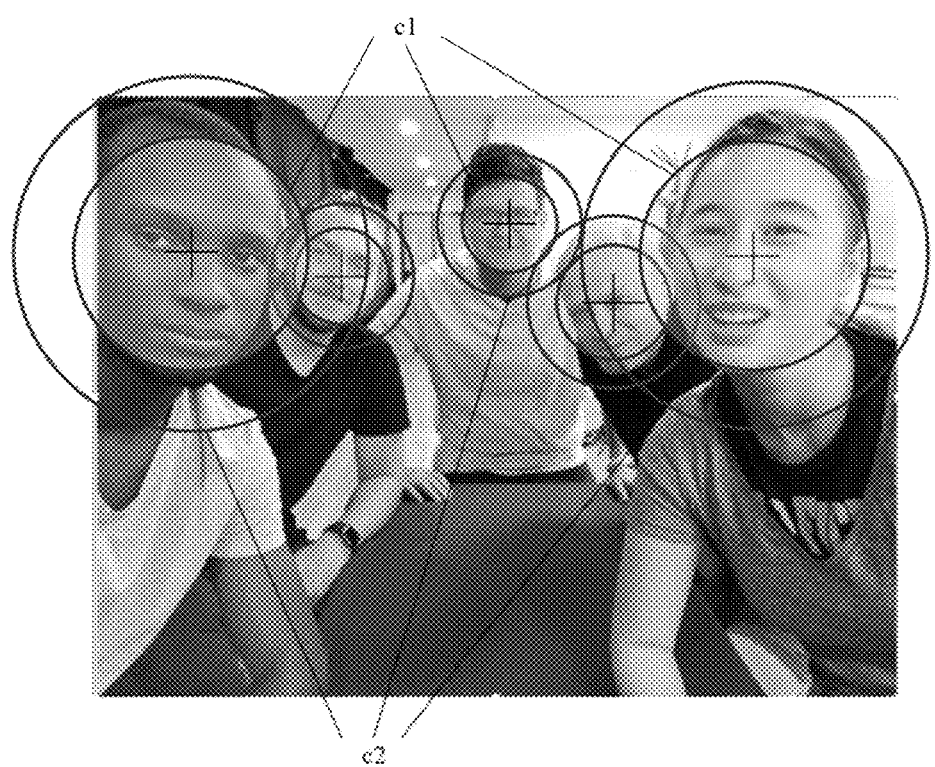
FIG. 9B is a schematic diagram illustrating determination of a face region, according to an exemplary embodiment.

In Operation 705, a reference diameter is set according to a range of the face, and a reference circle having a center at the face center is made according to the reference diameter. Herein, in fact, the range of the face is determined for face correction. The reference diameter is set according to the range of the face, and a correction range is determined by taking the face center as the circle center. In addition, multiple reference diameters are set and multiple concentric circles are made by taking the face center as the center, to implement correction based on certain correction offsets in a range of each circle during subsequent processing. For example, as shown in FIG. 9B, a first circle c1, called an inner circle c1, is made by taking a length of the face as a diameter, and a second circle c2, called an outer circle c2, is made by taking twice of the length of the face as a diameter. In such a manner, different areas of the face may be corrected to different degrees, so that a natural transition with a background may be formed, and the image is more natural. Herein, the circle made according to the reference diameter is called the reference circle. Both the inner circle c1 and outer circle c2 in the example are reference circles.

In Operation 706, an image weight coefficient matrix M corresponding to the image is determined according to the reference circle. Pixels in the reference circle are determined, and according to a set rule, an image weight coefficient for each pixel within the reference circle is determined to be a, a is a number greater than 0 and less than or equal to 1, and a weight coefficient for a pixel outside the reference circle is determined to be a=0. If there are multiple reference circles, an image weight coefficient for a pixel outside the outermost reference circle is determined to be a=0. A corresponding image weight coefficient is determined for each pixel in the whole image, and a matrix formed by these image weight coefficients is the image weight coefficient matrix M. Herein, the image weight coefficient for the pixel within the reference circle may be determined in multiple manners.

For example, when there is no other reference circle concentric with the reference circle, the image weight coefficient for the pixel within the reference circle is determined to be a=1 and the image weight coefficient for the pixel outside the reference circle is determined to be a=0; or, when the reference circle includes the inner circle c1 and outer circle c2 made by taking the face center as the circle center, an image weight coefficient for the pixel within the inner circle c1 is determined to be a=1 and an image weight coefficient for the pixel between the inner circle c1 and the outer circle c2 is determined to be a=0.6, or the image weight coefficient for the pixel within the inner circle c1 is determined to be a=1, and image weight coefficients a for the pixels between the inner circle c1 and the outer circle c2 may gradually decrease from the inner circle to the outer circle to achieve a transition effect, for example, gradually decrease according to a set step length, or, are determined according to proportional gradual decrease of distances from the inner circle to the outer circle. The weight coefficient for a pixel within the outer circle may be determined according to a formula 2:

$$a = 1 - \frac{d - c1}{c2 - c1}, \qquad \text{(formula 2)}$$

where d is a distance between the present pixel and the circle center, i.e., the face center, a is the weight coefficient for the present pixel, c1 is a distance between the circle center and a boundary of the inner circle, i.e., a radius of the inner circle, and c2 is a distance between the circle center and a boundary of the outer circle, i.e., a radius of the outer circle.

After the weight coefficient for each pixel in the image is determined, the corresponding weight coefficient matrix M may be obtained.

In Operation 707, the image weight coefficient matrix M is multiplied by the offset matrix O to obtain a final offset matrix H.

Distortion correction implemented by use of the related art is correction of the whole original image based on the offset matrix O, and image incoordination caused by excessive correction for the background may not be avoided. Therefore, the weight coefficient matrix M obtained in Operation 706 is multiplied by the offset matrix O herein, namely the image weight coefficient a of each pixel is multiplied by the corresponding correction offset (dx, dy) to obtain a required final offset a×(dx, dy). Since the image weight coefficients corresponding to a background region or a region not required to be corrected in the image weight coefficient matrix O are a=0 and are multiplied by the correction offsets (dx, dy) to obtain (0, 0), these pixels are actually not corrected; and the image weight coefficients a of the pixels in a face region are greater than 0 and less than or equal to 1, correction may be performed based on the corresponding final offsets a×(dx, dy) in the face region.

Herein, the required final offset is set to be (dx', dy'), and may be determined according to the following formula 3:

$$(dx', dy') = a \times (dx, dy) \qquad \text{(formula 3).}$$

A matrix formed by the final offset (dx', dy') of each pixel in the image is the final offset matrix M.

In Operation 708, the original image is corrected according to the final offset matrix M to obtain a corrected image matrix P. Since the final offset matrix M is obtained according to the correction offsets (dx, dy) and image weight coefficients obtained by use of the distortion correction method in the related art, final correction is actually performed on the pixels in the region required to be corrected, for example, the pixels in the face region in the abovementioned example, to a certain degree and part of image pixels of the original image is reserved, thereby implementing partial correction of the image. A finally obtained matrix of each corrected pixel is the image matrix P.

In Operation 709, a pixel value of a corrected pixel is determined by use of a bilinear interpolation method.

In the above operation, correction for the pixels of the image is implemented by operating the coordinates, and does not involve processing of a color value or grayscale value of each pixel. Therefore, correction of the image may not be completed only by determining the positions of the pixels, and it is also necessary to determine the color value or grayscale value of each corrected pixel to complete correction. Herein, the color value or grayscale value of the pixel is collectively referred to as pixel value.

Since the coordinate of the pixel of the image is operated for an image plane coordinate system of the pixel in the above operation, and after distortion correction, the coordinate obtained after the obtained correction offset for each pixel is multiplied by the image weight coefficient may be a non-integral value or a coordinate that does not correspond to the pixel. For an actual pixel in the finally formed image, a pixel value of the actual pixel is required to be determined according to pixels corresponding to coordinates, corresponding to coordinates of some closest corresponding pixels obtained by distortion correction in the image matrix P, in the original image. Herein, the actual pixel refers to a pixel that may finally be presented in the image. For an image with a certain resolution, a coordinate of each actual pixel may be determined.

Herein, the pixel value is determined by use of the bilinear interpolation method, which may be understood as the following operations.

In operation 1, a pixel in the corrected image is selected, a coordinate thereof being $(x_p, y_p)$.

The abovementioned correction process is practically an operation process, and the obtained coordinate of the pixel is an operation result (x, y). However, for an image practically to be generated, no pixel is at the position (x, y).

Herein, the selected pixel is an actual pixel in the corresponding corrected image and is at the position $(x_p, y_p)$ but no operation result consistent with the actual pixel is obtained after correction in the abovementioned operations. That is, no (x, y) obtained by correction processing is the same as $(x_p, y_p)$. Therefore, it is necessary to perform interpolation processing to determine a pixel value of the actual pixel.

In operation 2, four corrected coordinates (x, y) closest to the pixel are determined.

Figure 10:
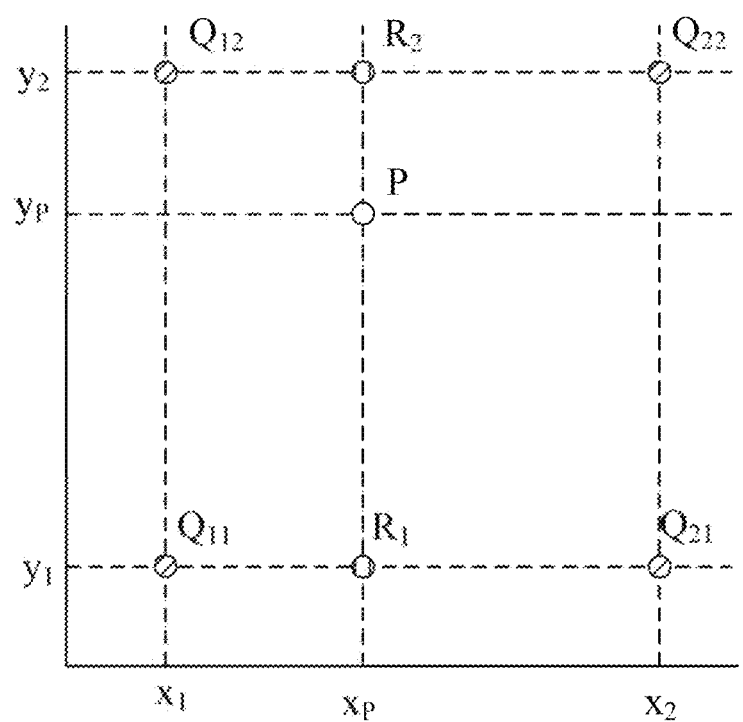
FIG. 10 is a schematic diagram illustrating determination of a pixel value of a pixel, according to an exemplary embodiment.

As shown in FIG. 10, the position of the actual pixel P is $(x_p, y_p)$ four corrected pixels closest to the actual pixel P are represented with $Q_{11}$, $Q_{12}$, $Q_{21}$ and $Q_{22}$ respectively, and the coordinates thereof are represented as $(x_1, y_1)$, $(x_2, y_2)$, $(x_2, y_1)$ and $(x_2, y_2)$ respectively. Through the corrected image matrix P obtained in Operation 708, the coordinates of the four pixels may be determined.

In operation 3, pixel values $f(Q_{11})$, $f(Q_{12})$, $f(Q_{21})$ and $f(Q_{22})$ corresponding to the pixels $Q_{11}$, $Q_{12}$, $Q_{21}$ and $Q_{22}$ are determined.

Since the four pixels $Q_{11}$, $Q_{12}$, $Q_{21}$ and $Q_{22}$ are all obtained by correcting corresponding original pixels in the original image, a corresponding pixel value in the original image may be determined for each pixel, and may be determined by detecting a color value or grayscale value of a corresponding pixel in the original image. Herein, the pixel values corresponding to the four pixels in the original image may be represented with $f(Q_{11})$, $f(Q_{12})$, $f(Q_{21})$ and $f(Q_{22})$ respectively and assigned to the corresponding corrected pixels $Q_{11}$, $Q_{12}$, $Q_{21}$ and $Q_{22}$.

In operation 4, interpolation operation is performed on the actual pixel P in an x direction and a y direction respectively to determine a pixel value f(P) of P.

At first, interpolation operation is performed twice under two y values $y_1$ and $y_2$ in the x direction, which may be implemented through the following formula 4:

$$f(x_P, y_1) = \frac{x_2 - x_P}{x_2 - x_1} f(Q_{11}) + \frac{x_P - x_1}{x_2 - x_1} f(Q_{21})$$ (formula 4)
$$f(x_P, y_2) = \frac{x_2 - x_P}{x_2 - x_1} f(Q_{12}) + \frac{x_P - x_1}{x_2 - x_1} f(Q_{22}).$$

Coordinates of two points R1 and R2 in the figure are obtained. Then, interpolation operation is performed once in the y direction, which may be implemented through the following formula 5:

$$f(P) = f(x_P, y_P) \approx \frac{y_2 - x_P}{y_2 - y_1} f(x_P, y_1) + \frac{y_P - y_1}{y_2 - y_1} f(x_P, y_2).$$ (formula 5)

In such a manner, the pixel value of the corrected actual pixel in the corrected image is obtained by use of the bilinear interpolation method. After each corrected pixel is calculated through this method, the final pixel value of each pixel in the whole image may be obtained, thereby obtaining the corrected image.

After Operation 709, the method may further include the following operation. In Operation 710, the corrected image is cropped to obtain a final image.

Figure 11A:
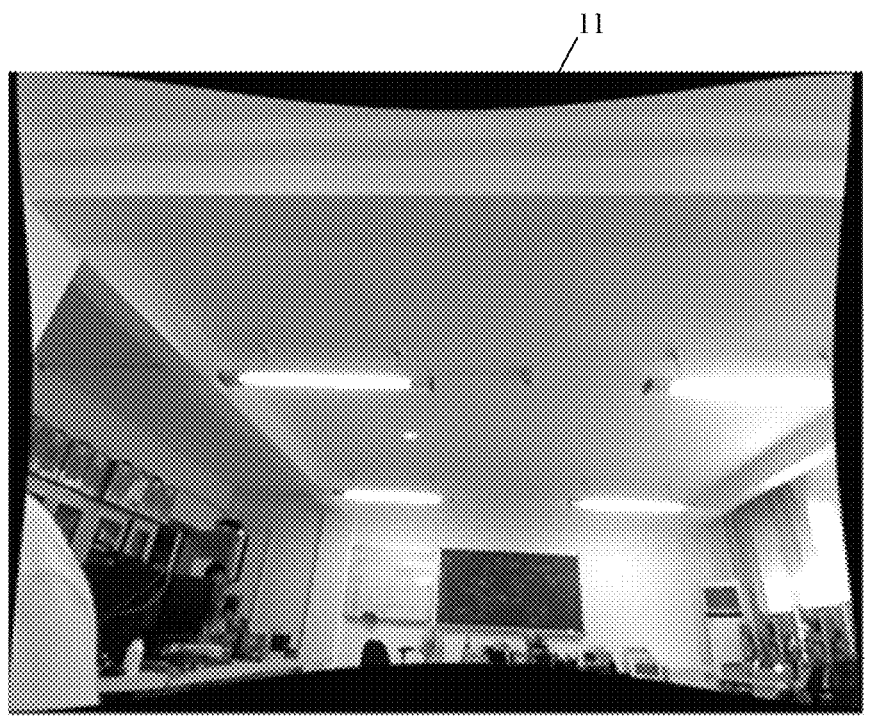
FIG. 11A is a schematic diagram illustrating edge indentation after image correction, according to an exemplary embodiment.

In Operation 709, correction of each unit to be corrected in the image is completed, and the pixel values of the corrected pixels are determined. After correction is completed, all the corrected images and all the uncorrected pixels outside a corrected region form the corrected image together. Since the positions of the pixels are regulated in the correction process, an edge of the obtained image may be indented, namely the pixel values of some pixel positions on the edge of the image are 0 and an irregular black edge 11 is presented, as shown in FIG. 11A.

Figure 11B:
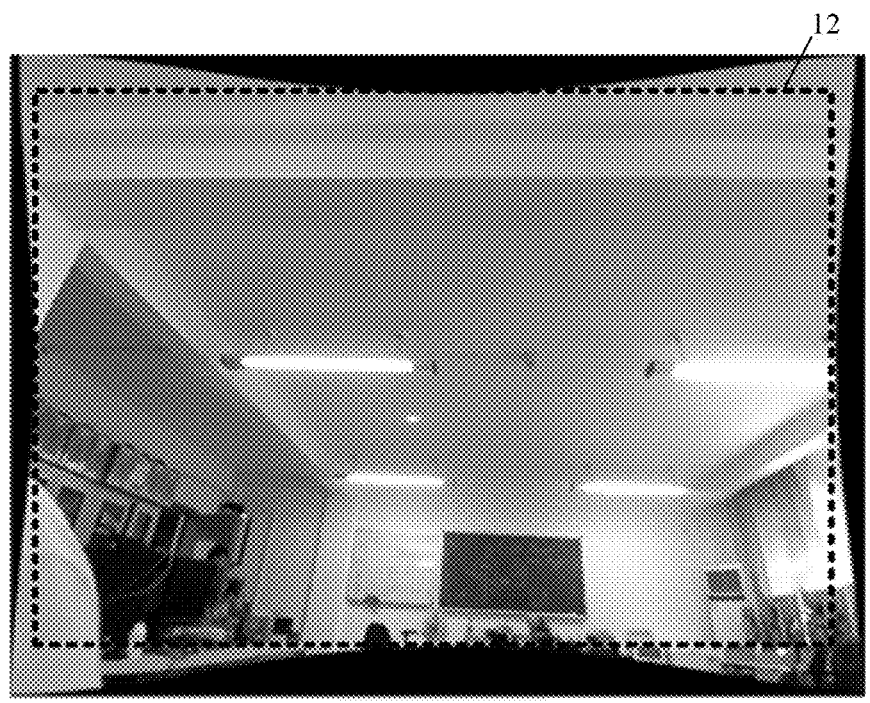
FIG. 11B is a schematic diagram illustrating cropping of a corrected image, according to an exemplary embodiment.

In such case, a rectangular frame 11 capable of surrounding a largest image region in the image is selected and cropped to remove the irregular black edge to obtain the final image, as shown in FIG. 11B.

Figure 11C:
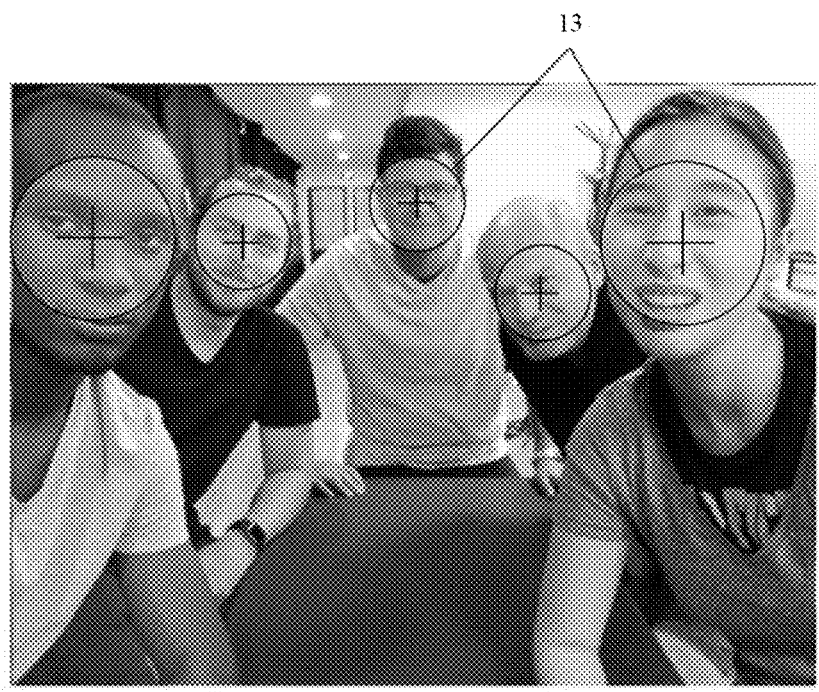
FIG. 11C is a schematic diagram illustrating a corrected image, according to an exemplary embodiment.

For adaptation to the original image, proper scaling may be performed to scale up the processed image to a size the same as that of the original image to finally complete distortion correction of the image. As shown in FIG. 11C, distortion of a face 13 in the corrected image is corrected, and an effect of a background part in the original image is kept.

According to the embodiment of the present disclosure, through the method of determining the weight coefficient for each pixel, each unit to be corrected in part of regions of the image is corrected, and the effect of the pixels in the other part of regions not required to be corrected in the original image is kept, so that, when the pixel values of the corrected pixels are calculated, the uncorrected part may also be excluded, and only the pixel values of the corrected pixels are calculated. Therefore, a calculated amount is greatly reduced, in addition, a final correction result is ensured, distortion correction may be pertinently performed on part of contents in the image, incoordination caused by full-image correction is avoided, and quality of the image is improved.

Figure 12:
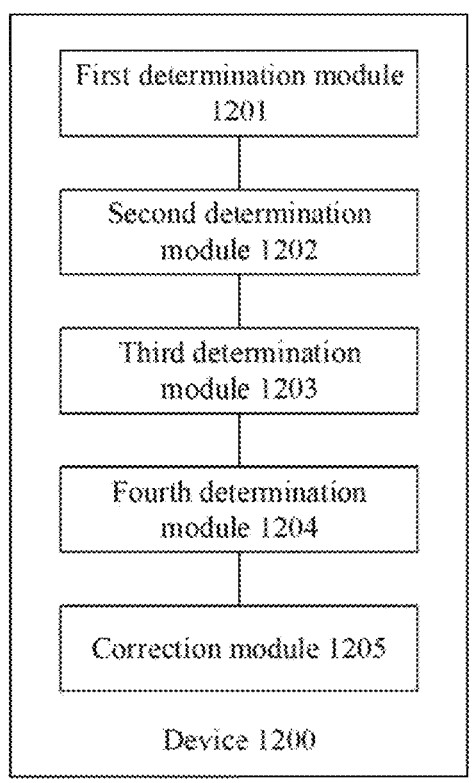
FIG. 12 is a block diagram of an image correction device, according to an exemplary embodiment.

FIG. 12 is a block diagram of an image correction device, according to an exemplary embodiment. As shown in FIG. 12, the device 1200 can include a first determination module 1201, a second determination module 1202, a third determination module 1203, a fourth determination module 1204, and a correction module 1205.

The first determination module 1201 is configured to determine a correction offset for each unit to be corrected in an image. The second determination module 1202 is configured to determine at least one target region in the image. The third determination module 1203 is configured to determine an image weight coefficient for each unit to be corrected in the image according to the target region. The fourth determination module 1204 is configured to determine a final offset for each unit to be corrected in the image according to the image weight coefficient and the correction offset. The correction module 1205 is configured to correct each unit to be corrected in the image according to the final offset.

In another embodiment, the second determination module 1202 is specifically configured to determine a central position and a first set value according to a characteristic of the target region, determine an first circle having a center at the central position and a diameter of the first set value, and determine a region in the first circle to be a target region.

Figure 13:
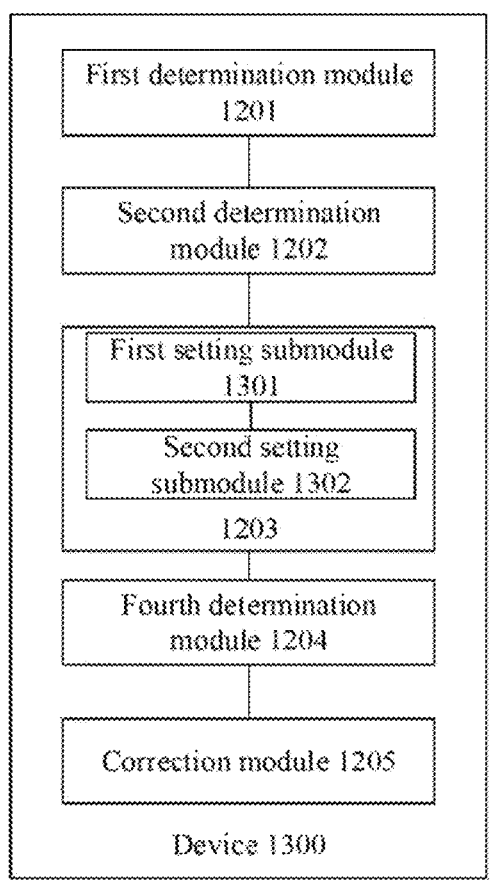
FIG. 13 is a block diagram of another image correction device, according to an exemplary embodiment.

FIG. 13 is a block diagram of an image correction device, according to an exemplary embodiment. Referring to FIG. 13, the device 1300 includes the first determination module 1201, the second determination module 1202, the third determination module 1203, the fourth determination module 1204 and the correction module 1205. The third determination module 1203 includes a first setting submodule 1301 and a second setting submodule 1302.

The first setting submodule 1301 is configured to set a first image weight coefficient for each unit to be corrected in the target region, the first coefficient is greater than 0 and less than or equal to 1.

The second setting submodule 1302 is configured to set a second image weight coefficient for each unit to be corrected outside the target region in the image, the second coefficient is more than or equal to 0 and less than the first coefficient.

The third determination module 1203 includes the first setting submodule 1301 and the second setting submodule 1302. The first coefficient includes a third coefficient and a fourth coefficient.

Figure 14:
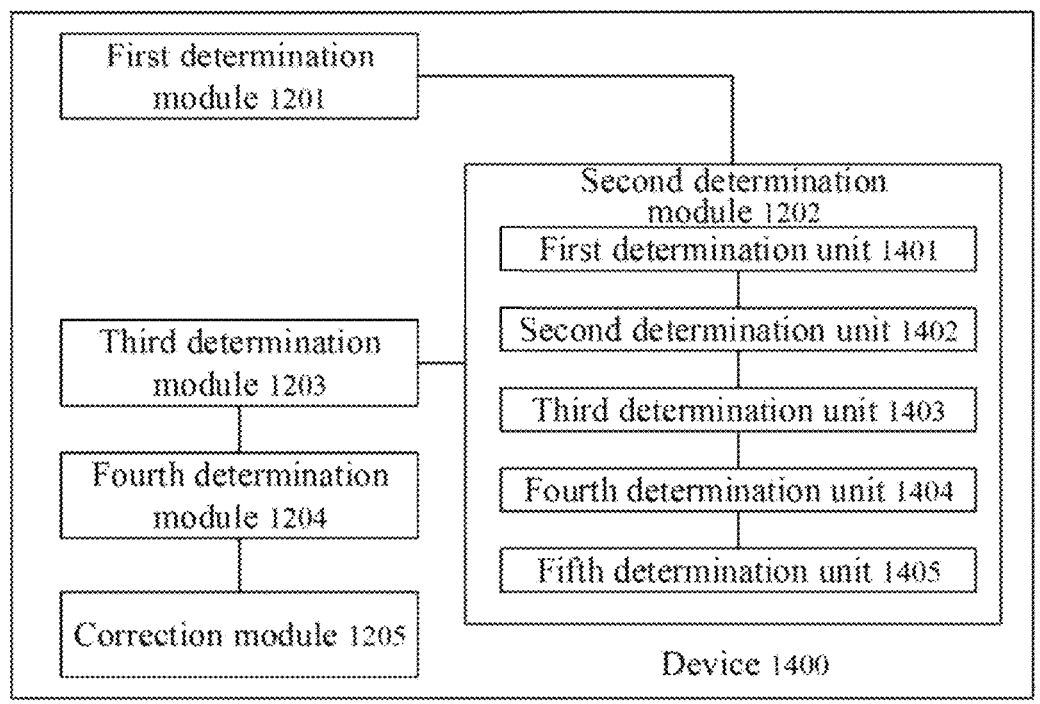
FIG. 14 is a block diagram of another image correction device, according to an exemplary embodiment.

The first setting submodule is further configured to determine a second set value according to a characteristic of the target region, determine a second circle having a center at the central position and a diameter of the second set value, the second set value is less than the first set value, set a third image weight coefficient for each unit to be corrected within the second circle, determine an annular region between the first circle and the second circle and set a fourth image weight coefficient for each unit to be corrected in the annular region, fourth image weight coefficients from the second circle to the first circle gradually decrease proportionally from the third image weight coefficient to the second image weight coefficient, FIG. 14 is a block diagram of an image correction device, according to an exemplary embodiment. Referring to FIG. 14, the device 1400 includes the first determination module 1201, the second determination module 1202, the third determination module 1203, the fourth determination module 1204 and the correction module 1205. The second determination module 1202 includes: a first determination submodule 1401, a second determination submodule 1402, a third determination submodule 1403, a fourth determination submodule 1404 and a fifth determination submodule 1405.

The first determination submodule 1401 is configured to determine a position of a face in the image according to a face recognition algorithm. The second determination submodule 1402 is configured to determine a face center according to the position of the face. The third determination submodule 1403 is configured to determine the face center to be the central position. The fourth determination submodule 1404 is configured to determine the first set value according to a range of the face. The fifth determination submodule 1405 is configured to determine the first circle having a center at the central position and a diameter of the first set value.

In another embodiment, the fourth determination submodule 1504 can be specifically configured to determine the first set value according to a length of the face.

Figure 15:
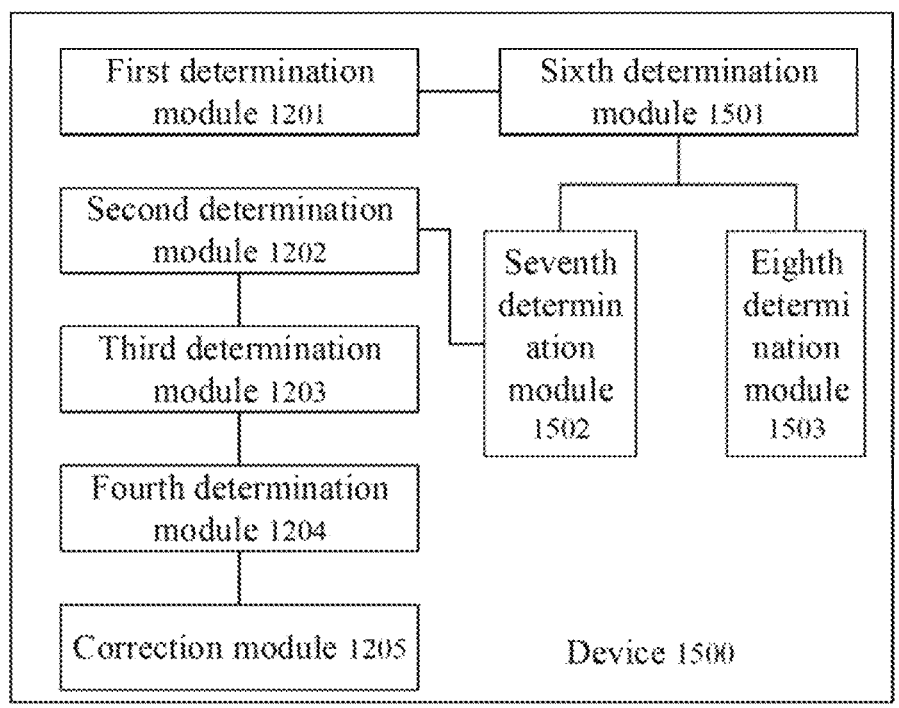
FIG. 15 is a block diagram of another image correction device, according to an exemplary embodiment.

FIG. 15 is a block diagram of an image correction device, according to an exemplary embodiment. Referring to FIG. 15, the device 1500 can include the first determination module 1201, the second determination module 1202, the third determination module 1203, the fourth determination module 1204, and the correction module 1205. As shown, the device can further include a sixth determination module 1501, a seventh determination module 1502, and an eighth determination module 1503.

A sixth determination module 1501 is configured to determine the position of the face in the image according to the face recognition algorithm. The seventh determination module 1502 is configured to, when determining that a distance between each unit to be corrected in the face and a center of the image is greater than a set threshold value, determine the target region. The eighth determination module 1503 is configured to, when determining that the distance between each unit to be corrected in the face and the center of the image is not greater than the set threshold value, determine the image weight coefficient for each unit to be corrected in the face to be a fifth coefficient, the fifth coefficient is less than 1 and more than or equal to 0.

Figure 16:
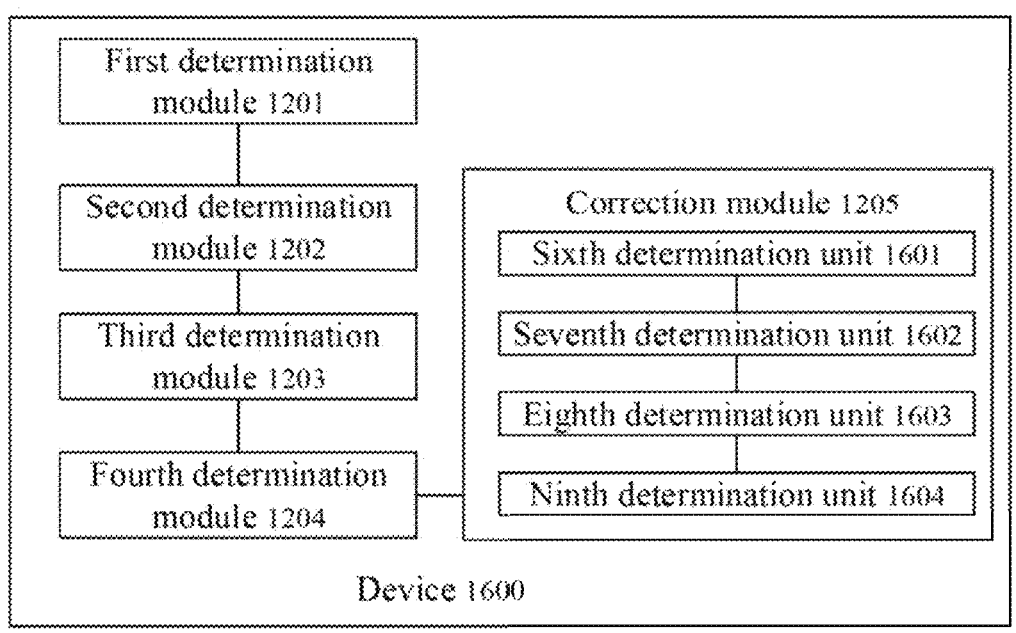
FIG. 16 is a block diagram of another image correction device, according to an exemplary embodiment.

FIG. 16 is a block diagram of an image correction device, according to an exemplary embodiment. Referring to FIG. 16, the device 1600 includes the first determination module 1201, the second determination module 1202, the third determination module 1203, the fourth determination module 1204, and the correction module 1205. The correction module 1205 can include a sixth determination submodule 1601, a seventh determination submodule 1602, an eighth determination submodule 1603, and a ninth determination submodule 1604.

The sixth determination submodule 1601 is configured to determine a coordinate of each unit to be corrected in the image according to the final offset. The seventh determination submodule 1602 is configured to determine an image matrix according to the coordinate of each unit to be corrected. The eighth determination submodule 1603 is configured to determine a pixel value of each unit to be corrected in the image matrix according to a corresponding pixel value of the unit to be corrected in the image matrix in an original image. The ninth determination submodule 1604 is configured to determine a pixel value of each unit to be corrected in the image according to the pixel value of the unit to be corrected in the image matrix, the pixel value includes a color value or a grayscale value.

With respect to the device in the above embodiment, the specific manners for performing operations for individual modules therein have been described in detail in the embodiment regarding the method, which will not be elaborated herein.

Figure 17:
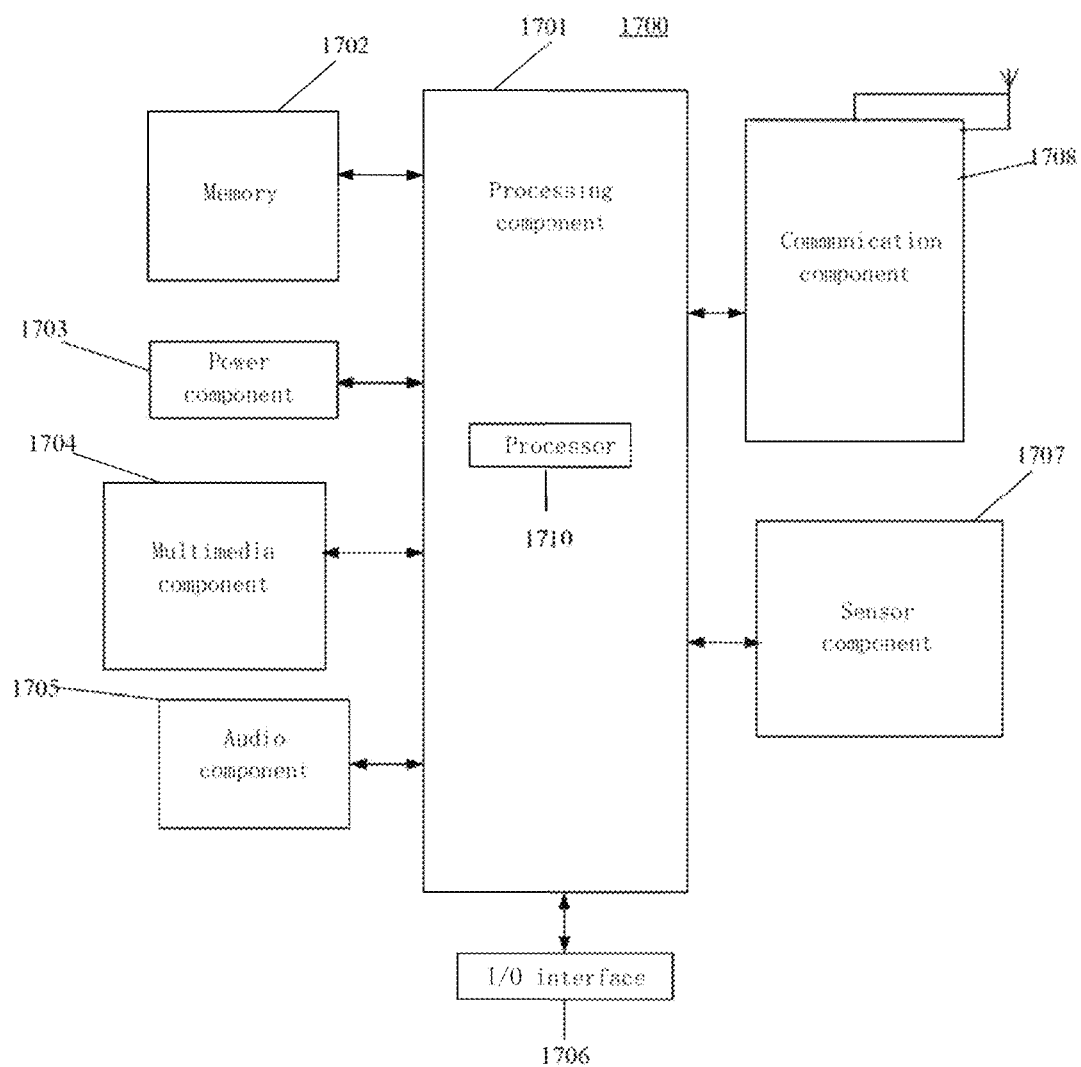
FIG. 17 is a physical structure block diagram of an image correction device, according to an exemplary embodiment.

FIG. 17 is a block diagram of an image correction device 1700, according to an exemplary embodiment. For example, the device 1700 may be a mobile phone, a computer, a digital broadcast terminal, a messaging device, a gaming console, a tablet, a medical device, exercise equipment, a personal digital assistant, and the like.

Referring to FIG. 17, the device 1700 may include one or more of the following components: a processing component 1701, a memory 1702, a power component 1703, a multimedia component 1704, an audio component 1705, an Input/Output (I/O) interface 1706, a sensor component 1707, and a communication component 1708.

The memory 1702 is configured to store an executable instruction capable of running in the processor 1701.

When the processor 1701 is configured to run the executable instruction, the executable instruction executes the operations in the image correction method provided in any method embodiment.

The processing component 1701 typically controls overall operations of the device 1700, such as the operations associated with display, telephone calls, data communications, camera operations, and recording operations. The processing component 1701 may include one or more processors 1710 to execute instructions to perform all or part of the operations in the abovementioned method. Moreover, the processing component 1701 may further include one or more modules which facilitate interaction between the processing component 1701 and the other components. For instance, the processing component 1701 may include a multimedia module to facilitate interaction between the multimedia component 1704 and the processing component 1701.

The memory 1710 is configured to store various types of data to support the operation of the device 1700. Examples of such data include instructions for any applications or methods operated on the device 1700, contact data, phonebook data, messages, pictures, video, etc. The memory 1702 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1703 provides power for various components of the device 1700. The power component 1703 may include a power management system, one or more power supplies, and other components associated with generation, management and distribution of power for the device 1700.

The multimedia component 1704 includes a screen providing an output interface between the device 1700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1704 includes a front camera and/or a rear camera. The front camera and/or the rear camera may receive external multimedia data when the device 1700 is in an operation mode, such as a photographing mode or a video mode. Each of the front camera and/or the rear camera may be a fixed optical lens system or have focusing and optical zooming capabilities.

The audio component 1705 is configured to output and/or input an audio signal. For example, the audio component 1705 includes a Microphone (MIC), and the MIC is configured to receive an external audio signal when the device 1700 is in the operation mode, such as a call mode, a recording mode and a voice recognition mode. The received audio signal may further be stored in the memory 1710 or sent through the communication component 1708. In some embodiments, the audio component 1705 further includes a speaker configured to output the audio signal.

The I/O interface 1706 provides an interface between the processing component 1701 and a peripheral interface module, and the peripheral interface module may be a keyboard, a click wheel, a button and the like. The button may include, but not limited to: a home button, a volume button, a starting button and a locking button.

The sensor component 1707 includes one or more sensors configured to provide status assessment in various aspects for the device 1700. For instance, the sensor component 1707 may detect an on/off status of the device 1700 and relative positioning of components, such as a display and small keyboard of the device 1700, and the sensor component 1707 may further detect a change in a position of the device 1700 or a component of the device 1700, presence or absence of contact between the user and the device 1700, orientation or acceleration/deceleration of the device 1700 and a change in temperature of the device 1700. The sensor component 1707 may include a proximity sensor configured to detect presence of an object nearby without any physical contact. The sensor component 1707 may also include a light sensor, such as a Complementary Metal Oxide Semiconductor (CMOS) or Charge Coupled Device (CCD) image sensor, configured for use in an imaging application. In some embodiments, the sensor component 1707 may also include an acceleration sensor, a gyroscope sensor, a magnetic sensor, a pressure sensor or a temperature sensor.

The communication component 1708 is configured to facilitate wired or wireless communication between the device 1700 and another device. The device 1700 may access a communication-standard-based wireless network, such as a Wireless Fidelity (WiFi) network, a 2nd-Generation (2G) or 3rd-Generation (3G) network or a combination thereof. In an exemplary embodiment, the communication component 1708 receives a broadcast signal or broadcast associated information from an external broadcast management system through a broadcast channel. In an exemplary embodiment, the communication component 1708 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology or another technology.

In an exemplary embodiment, the device 1700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1702 including an instruction, and the instruction may be executed by the processor 1710 of the device 1700 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, an instruction in the storage medium is executed by a processor of a mobile terminal to enable the mobile terminal to execute the image correction method in any abovementioned embodiment. In an embodiment, the method can include determining a correction offset for each unit to be corrected in an image, determining a target region in the image, and determining an image weight coefficient for each unit to be corrected in the image is determined according to the target region. Additionally, the method can include determining a final offset for each unit to be corrected in the image is determined according to the image weight coefficient and the correction offset, and each unit to be corrected in the image is corrected according to the final offset.

The technical solutions provided in the embodiments of the present disclosure may have the following beneficial effects: corresponding image weight coefficients are set for different regions in the image, and different regions in the image are corrected to different degrees according to the image weight coefficients, so that incoordination caused by full-image correction is avoided.

Figure 18:
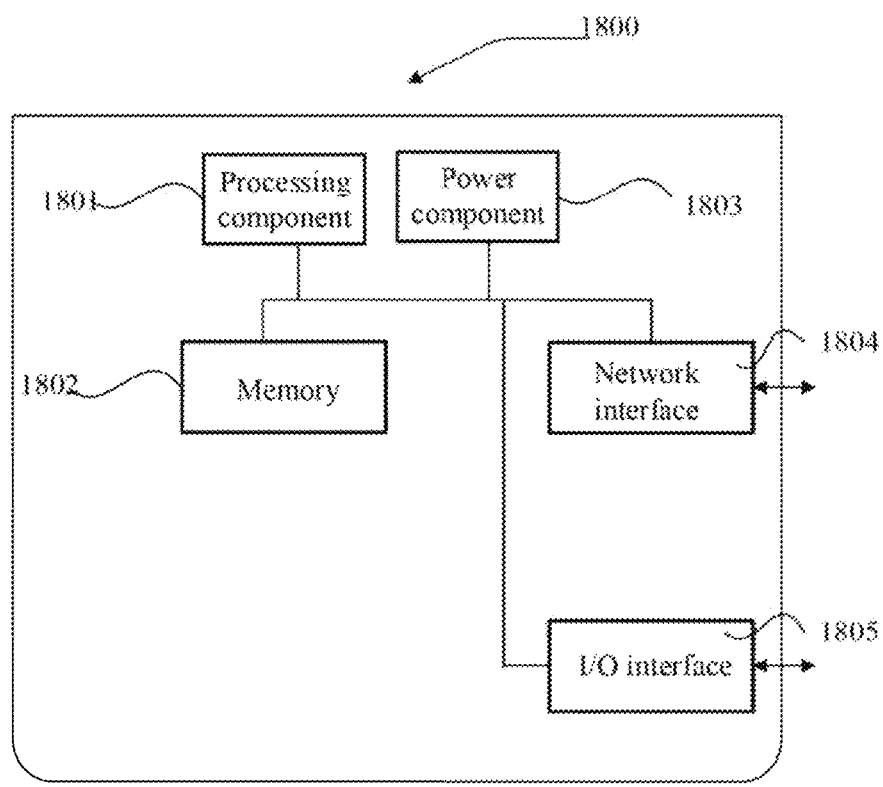
FIG. 18 is a physical structure block diagram of another image correction device, according to an exemplary embodiment.

FIG. 18 is a block diagram of an application program icon control device 1800, according to an exemplary embodiment. For example, the device 1800 may be provided as a device with a processing capability. Referring to FIG. 18, the device 1800 includes a processing component 1801, further including one or more processors, and a memory resource represented by a memory 1802, configured to store an instruction executable for the processing component 1801, for example, an application program. The application program stored in the memory 1802 may include one or more than one module of which each corresponds to a set of instructions. In addition, the processing component 1801 is configured to execute the instruction to execute the application program icon control method in any abovementioned embodiment.

The device 1800 may further include a power component 1803 configured to execute power management of the device 1800, a wired or wireless network interface 1804 configured to connect the device 1800 to a network and an I/O interface 1805. The device 1800 may be operated based on an operating system stored in the memory 1802, for example, Windows Server™, Mac OS X™, Unix™, Linux™, FreeBSD™, or the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer.

Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for image correction, comprising:

determining a correction offset for each unit to be corrected in an image;

determining at least one target region in the image;

determining, according to the at least one target region, an image weight coefficient for each unit to be corrected in the image;

determining, according to the image weight coefficient and the correction offset, a final offset for each unit to be corrected in the image; and correcting, according to the final offset, each unit to be corrected in the image, wherein determining the at least one target region in the image comprises:

determining a central position and a first set value according to a characteristic, of a region to be corrected;

determining a first circle having a center at the central position and a diameter equal to the first set value; and setting a region within the first circle to be a target region, wherein determining, according to the at least one target region, the image weight coefficient for each unit to be corrected in the image comprises:

setting a first image weight coefficient for each unit to be corrected in the target region, the first image weight coefficient being greater than 0 and less than or equal to 1; and setting a second image weight coefficient for each unit to be corrected outside the target region in the image, the second image weight coefficient being greater than or equal to 0 and less than the first image weight coefficient, wherein the first image weight coefficient comprises a third image weight coefficient and a fourth image weight coefficient, and setting the first image weight coefficient for each unit to be corrected in the target region comprises:

determining a second set value according to a characteristic of the target region;

determining a second circle having a center at the central position and a diameter equal to the second set value, the second set value being less than the first set value;

sating the third image weight coefficient for each unit to be corrected within the second circle;

determining an annular region between the first circle and the second circle; and setting the fourth image weight coefficient for each unit to be corrected in the annular region, the fourth image weight coefficient from the second circle to the first circle gradually decreasing proportionally from the third image weight coefficient to the second, image weight coefficient.

2. The method of claim 1, wherein determining the first circle having the center at the central position and the diameter equal to the first set value further comprises:
 determining a position of a face in the image according to a face recognition algorithm;
 determining a face center according to the position of the face;
 determining the face center to be the central position;
 determining the first set value according to a length of the face; and
 determining the first circle having the center at the central position and the diameter equal to the first set value.

3. The method of claim 1, before determining the at least one target region, further comprising:
 determining a set threshold value;
 for units to be corrected whose distances from a center of the image are greater than the set threshold value, determining the at least on target region; and
 for units to be corrected whose distances from the center of the image are not greater than the set threshold value, determining the image weight coefficient to be a coefficient that is less than 1 and greater than or equal to 0.

4. The method of claim 1, wherein correcting, according to the final offset, each unit to be corrected in the image further comprises:
 determining, according to the final offset, a coordinate of each unit to be corrected in the image;
 determining an image matrix according to the coordinate of each unit to be corrected;
 determining, according to a pixel value of each unit to be corrected in an original image, a pixel value of each unit to be corrected in the image matrix; and
 determining, according to the pixel value of each unit to be corrected in the image matrix, a pixel value of each unit to be corrected in a corrected image, the pixel value including a color value or a grayscale value.

5. The method of claim 1, further comprising, after correcting each unit to be corrected in the image according to the final offset,
 determining; according to a corrected image, a region to be cropped; and
 cropping, according to the region to be cropped, the corrected image.

6. An image correction device, comprising:
 a processor; and
 a memory configured to store instructions executable by the processor,
 wherein the processor is configured to run the instructions to:
  determine a correction offset for each unit to be corrected in an image;
  determine at least one target region in the image;
  determine, according to the at least one target region, an image weight coefficient for each unit to be corrected in the image;
  determine, according to the image weight coefficient and the correction offset, a final offset for each unit to be corrected in the image; and
  correct, according to the final offset, each unit to be corrected in the image,
 wherein the processor is further configured to run the instructions to:
  determine, according to a characteristic of a region to be corrected, a central position and a first set value;
  determine a first circle having a center at the central position and a diameter equal to e first set value;
  set a region within the first circle to be a target region;
  set a first image weight coefficient for each unit to be corrected in the target region, the first image weight coefficient being greater than 0 and less than or equal to 1; and
  set a second image weight coefficient for each unit to be corrected outside the target region in the image, the second image weight coefficient being greater than or equal to 0 and less than the first image weight coefficient,
 wherein the first image weight coefficient comprises a third image weight coefficient and a fourth image weight coefficient, and the processor is further configured to run the instructions to:
  determine a second set value according to a characteristic of the target region,
  determine a second circle having a center at the central position and a diameter equal to the second set value the second set value being less than the first set value;
  set the third image weight coefficient for each unit to be corrected within the second circle;
  determine an annular region between the first circle and the second circle; and
  set the fourth image weight coefficient for each unit to be corrected in the annular region, the fourth image weight coefficient from the second circle to the first circle gradually decreasing proportionally from the third image weight coefficient to the second image weight coefficient.

7. The device of claim 6, wherein the processor is further configured to run the instructions to:
 determine a position of a face in the image according to a face recognition algorithm;
 determine a face center according to the position of the face;
 determine the face center to be the central position;
 determine the first set value according to a length of the face; and
 determine the first circle having the center at the central position and the diameter equal to the first set value.

8. The device of claim 6, wherein the processor is further configured to run the instructions to:
 determine a set threshold value;
 determine the at least one target region for units to be corrected whose distances from a center of the image are greater than the set threshold value; and
 determine, for units to be corrected Those distances from the center of the image are not greater than the se threshold value, the image weight coefficient to be a coefficient that is less than 1 and greater than or equal to 0.

9. The device of claim 6, wherein the processor is further configured to run the instructions to:
 determine, according to the final offset, a coordinate of each unit to be corrected in the image;
 determine, according to the coordinate of each unit to be corrected, an image matrix;
 determine, according to a pixel value of each unit to be corrected in an original image, a pixel value of each unit to be corrected in the image matrix; and
 determine, according to the pixel value of each unit to be corrected in the image mat a pixel value of each unit to be corrected in a corrected image, the pixel value including a color value or a grayscale value.

10. The device of claim 6, wherein the processor is further configured to run the instructions to:
- determine, according to a corrected image, a region to be cropped; and
- crop, according to the region to be cropped, the corrected image.

11. A non-transitory computer-readable storage medium having computer-executable instructions stored thereon, the computer-executable instructions being executed by a processor to perform a method including the steps of:
- determining a correction offset for each unit to be corrected in an image;
- determining at least one target region in the image;
- determining, according to the at least one target region, an image weight coefficient for each unit to be corrected in the image;
- determining, according to the image weight coefficient and the correction offset, a final offset for each unit to be corrected in the image; and
- correcting, according to the final offset, each unit to be corrected in the image,
- wherein determining the at least one target region in the image comprises:
  - determining a central position and a first set value according to a characteristic of a region to be corrected;
  - determining a first circle having a center at the central position and a diameter equal to the first set value; and
  - setting a region within the first circle to be a target region,
- wherein determining, according to the at least one target region, the image weight coefficient for each unit to be corrected in the image comprises:
  - setting a first image weight coefficient for each unit to be corrected in the target region, the first image weight coefficient being greater than 0 and less than or equal to 1; and
  - setting a second image weight coefficient for each unit to be corrected outside the target region in the image, the second image weight coefficient being greater than or equal to 0 and less than the first image weight coefficient,
- wherein the first image weight coefficient comprises a third image weight coefficient and a fourth image weight coefficient, and setting the first image weight coefficient for each unit to be corrected in the target region comprises:
  - determining a second set value according to a characteristic of the target region;
  - determining a second circle having a center at the central position and a diameter equal to the second set value the second set value being less than the first set value;
  - setting the third image weight coefficient for each unit to be corrected within the second circle;
  - determining an annular region between the first circle and the second circle; and
  - setting the fourth image weight coefficient for each unit to be corrected in the annular region, the fourth image weight coefficient from the second circle to the first circle gradually decreasing proportionally from the third image weight coefficient to the second image weight coefficient.

* * * * *